(12) United States Patent
Sang et al.

(10) Patent No.: US 12,449,434 B2
(45) Date of Patent: Oct. 21, 2025

(54) AUTOMATED ASSAY PROCESSING METHODS AND SYSTEMS

(71) Applicant: ACCURE HEALTH INC., Cambridge, MA (US)

(72) Inventors: Liyun Sang, Cambridge, MA (US); Guang Chen, Newton, MA (US); Qiang Liu, Cambridge, MA (US); Brian Wee, Somerville, MA (US)

(73) Assignee: ACCURE HEALTH INC., Cambridge, MA (US)

( * ) Notice: Subject to any disclaimer, the term of this patent is extended or adjusted under 35 U.S.C. 154(b) by 1050 days.

(21) Appl. No.: 17/209,082

(22) Filed: Mar. 22, 2021

(65) Prior Publication Data
US 2021/0208169 A1    Jul. 8, 2021

Related U.S. Application Data

(63) Continuation of application No. PCT/US2019/054906, filed on Oct. 6, 2019.

(60) Provisional application No. 62/742,889, filed on Oct. 8, 2018.

(51) Int. Cl.
*G01N 35/00*    (2006.01)
*B01F 31/23*    (2022.01)
*B01L 3/00*    (2006.01)

(52) U.S. Cl.
CPC ......... *G01N 35/0098* (2013.01); *B01F 31/23* (2022.01); *B01L 3/5027* (2013.01); *B01L 3/502707* (2013.01); *G01N 35/00584* (2013.01); *G01N 2035/00524* (2013.01); *G01N 2035/00564* (2013.01)

(58) Field of Classification Search
None
See application file for complete search history.

(56) References Cited

U.S. PATENT DOCUMENTS

| 5,238,812 A | 8/1993 | Coulter et al. |
| 2002/0179445 A1 | 12/2002 | Alajoki et al. |
| 2006/0129327 A1 | 6/2006 | Kim et al. |

(Continued)

FOREIGN PATENT DOCUMENTS

| WO | WO-2018119401 A2 * | 6/2018 | ........ B01L 3/502753 |
| WO | WO-2019016562 A1 * | 1/2019 | ............ B01L 3/5027 |
| WO | 2020076659 A1 | 4/2020 | |

OTHER PUBLICATIONS

Extended European Search Report in corresponding European Application No. 19871698.7 dated Jun. 15, 2022 (10 pages).

(Continued)

*Primary Examiner* — P. Kathryn Wright
(74) *Attorney, Agent, or Firm* — Bayes PLLC

(57) ABSTRACT

Embodiments of automated assay processing systems and methods are disclosed. In an example, an assay automation system includes an assay processing tube, a magnet, and a controller. The assay processing tube has a right arm and a left arm, the right arm having an opening for receiving reagent transferred from a reagent tube being held in one of the tube-holding arms of the reagent tube holder, the assay processing tube being driven to rotate. The magnet is driven to move vertically. The controller is configured to control coordinated movements of the assay processing tube and the magnet to perform an assay processing sequence.

13 Claims, 25 Drawing Sheets

(56) References Cited

U.S. PATENT DOCUMENTS

| | | |
|---|---|---|
| 2007/0217951 A1 | 9/2007 | Matsumoto |
| 2008/0056949 A1 | 3/2008 | Lee et al. |
| 2011/0124128 A1* | 5/2011 | Oosterbroek .... G01N 33/54326 |
| | | 422/72 |
| 2015/0190806 A1* | 7/2015 | Yuen .................... B01L 3/5023 |
| | | 137/1 |
| 2016/0195524 A1 | 7/2016 | Cowan et al. |
| 2017/0246600 A1 | 8/2017 | Jakobsen et al. |
| 2017/0261431 A1 | 9/2017 | Air et al. |
| 2017/0276682 A1 | 9/2017 | Park |
| 2018/0003704 A1 | 1/2018 | Horii et al. |
| 2021/0146361 A1* | 5/2021 | Wong .................... B03C 1/0332 |

OTHER PUBLICATIONS

International Search Report and Written Opinion of the International Searching Authority issued in corresponding International Application No. PCT/US2019/054906, mailed Jan. 31, 2020. 42 pages.

Office Action in related European Application No. 19871698.7 dated Oct. 15, 2024 (7 pages).

* cited by examiner

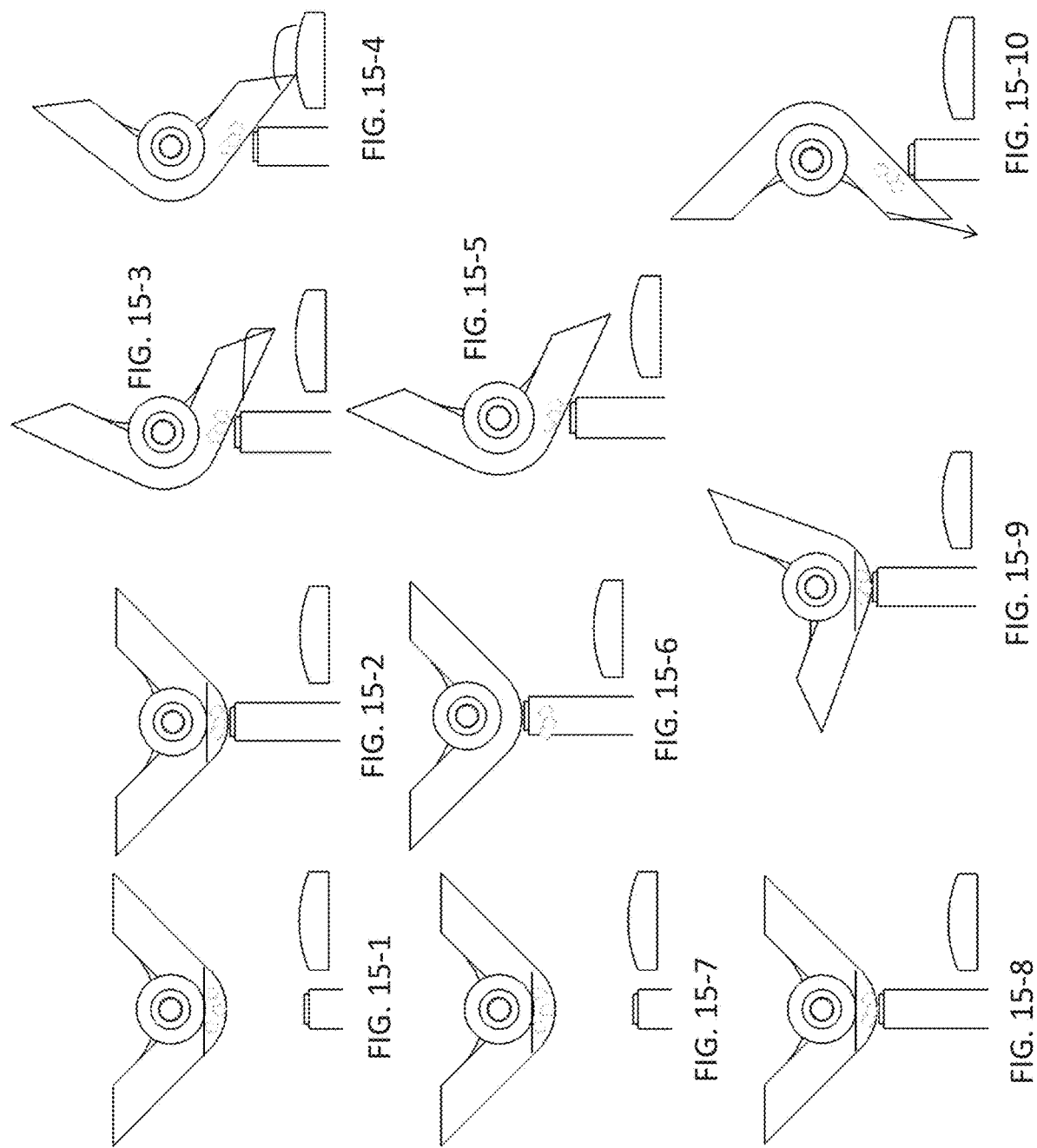

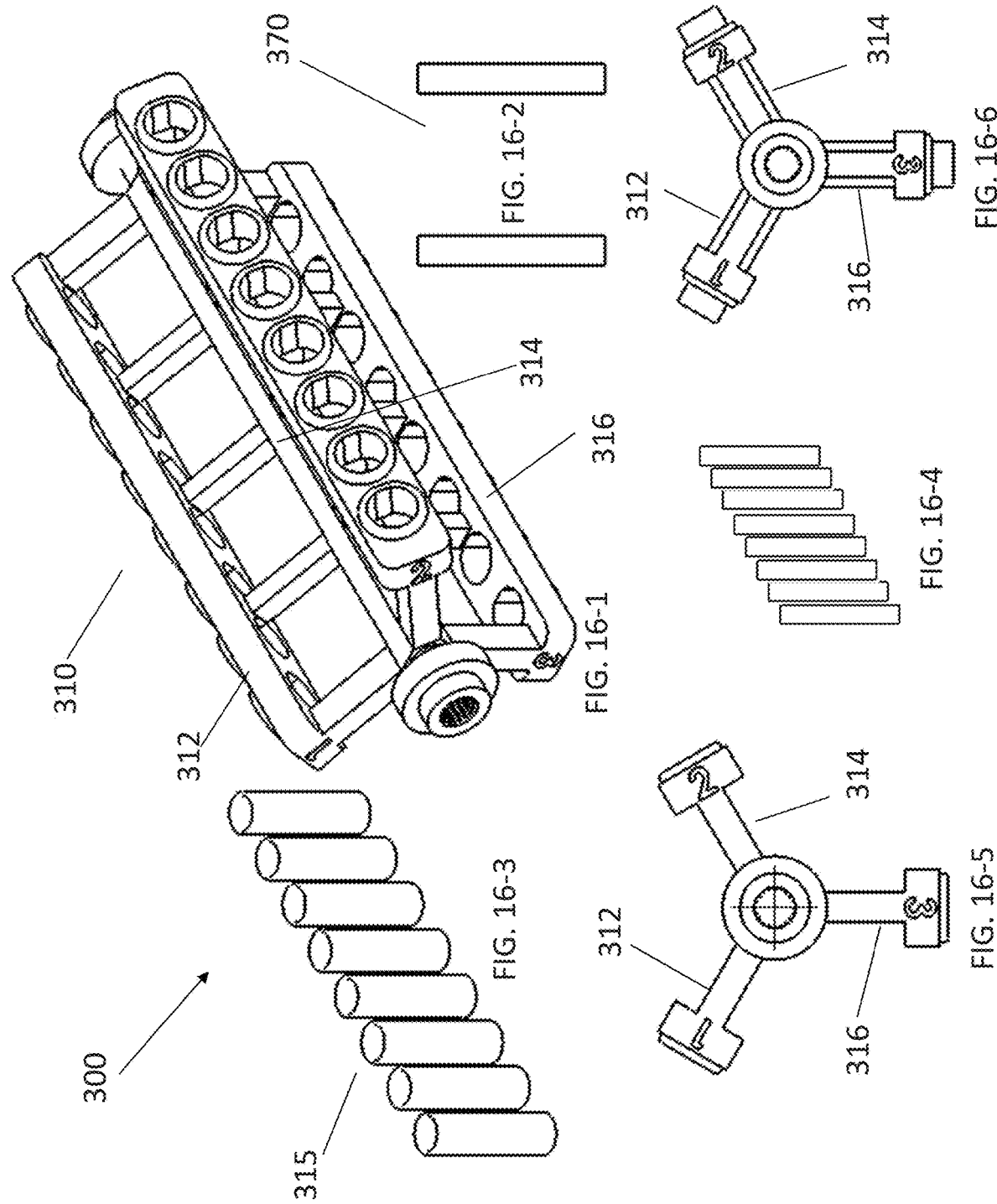

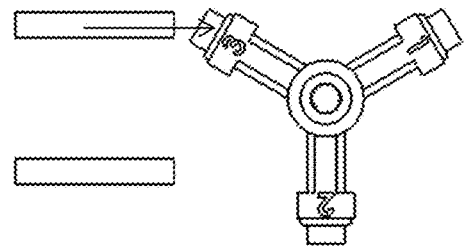
FIG. 17-1
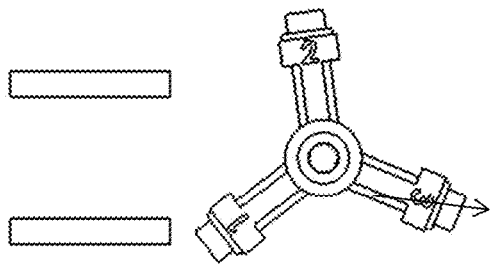
FIG. 17-3
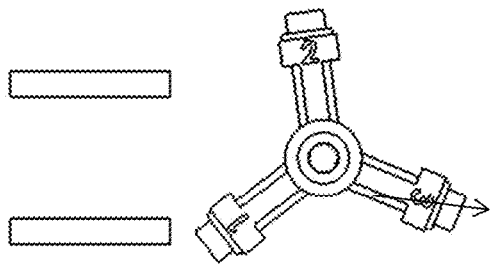
FIG. 17-5
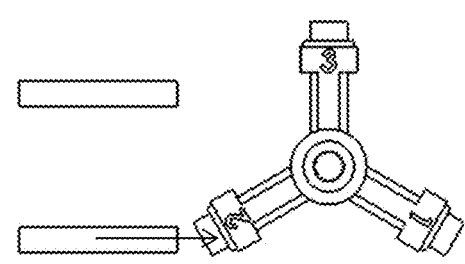
FIG. 17-2
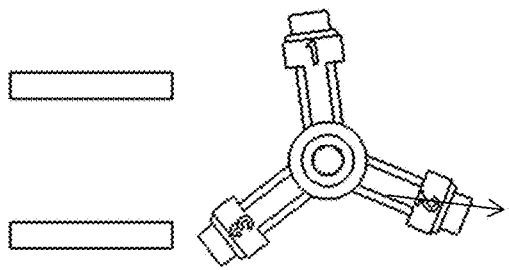
FIG. 17-4
FIG. 17-6

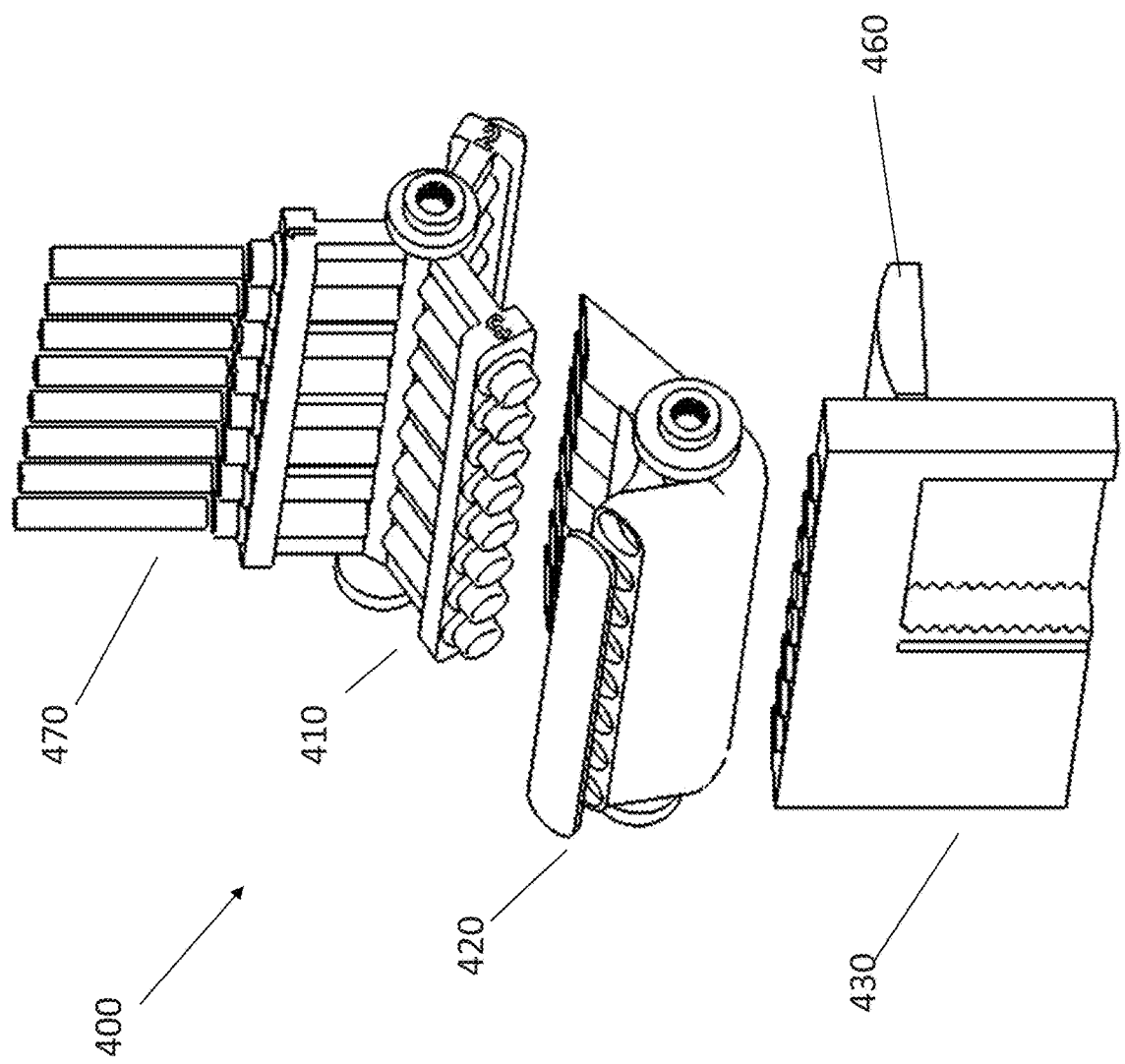

AUTOMATED ASSAY PROCESSING METHODS AND SYSTEMS

CROSS REFERENCE TO RELATED APPLICATION

This application is continuation of International Application No. PCT/US2019/054906, filed Oct. 6, 2019, entitled "AUTOMATED ASSAY PROCESSING METHODS AND SYSTEMS," which claims the benefits of priority to U.S. Provisional Application No. 62/742,889, filed Oct. 8, 2018, both of which are incorporated herein by reference in their entireties.

BACKGROUND

Embodiments of the present disclosure relate to automated assay processing systems and methods.

An assay is an investigative or analytic procedure in laboratory medicine, pharmacology, environmental biology, and molecular biology for qualitatively assessing or quantitatively measuring the presence, amount, or functional activity of a target entity (the analyte). Assays have become a routine part of modern medical, environmental, pharmaceutical, forensic and many other businesses at various scales from industrial to curbside or field level. Conducting assay procedures manually is not only labor-intensive but also error-prone. Assay automation has many benefits including low labor costs, high productivity, and high accuracy.

SUMMARY

Embodiments of automated assay processing systems and methods are disclosed herein.

In one example, an assay automation system includes a reagent tube holder, an assay processing tube, a magnet, and a controller. The reagent tube holder has a plurality of tube-holding arms. Each tube-holding arm is configured to hold a reagent tube. The reagent tube holder is driven to rotate. The assay processing tube has a right arm and a left arm. The right arm has an opening for receiving reagent transferred from a reagent tube being held in one of the tube-holding arms of the reagent tube holder. The assay processing tube is driven to rotate. The magnet is driven to move vertically. The controller is configured to control coordinated movements of the reagent tube holder, the assay processing tube, and the magnet to perform an assay processing sequence.

In another example, an automated assay processing system includes an assay processing tube assembly of a pre-configured shape, a magnet assembly, and a controller. The assay processing tube assembly includes a plurality of assay processing tubes. Each assay processing tube includes a right arm having an opening for receiving a reagent and a left arm having an opening. The assay processing tube assembly is driven to rotate. The magnet assembly includes a plurality of magnets secured on a magnet holder. The number of magnets corresponds to the number of assay processing tubes. The magnet assembly is driven to move vertically. The controller is configured to control coordinated movements of the assay processing tube assembly and the magnet assembly to perform an assay processing sequence.

In further another example, an automated reagent transferring system includes a reagent tube holder, one or more sets of dispensers above the reagent tube holder, and a controller. The reagent tube holder has a plurality of tube-holding arms. Each tube-holding arm is configured to hold a set of a plurality of reagent tubes. The reagent tube holder is driven to rotate. Each set of dispensers has the same number of dispensers as the number of reagent tubes in each set of reagent tubes. The controller is configured to control coordinated movements of the reagent tube holder and the dispensers to achieve a coordination between the reagent tube holder and the dispensers.

In still another example, an assay automation system includes an assay processing tube assembly of a pre-configured shape, a reagent tube holder, a magnet assembly, and a controller. The assay processing tube assembly includes a plurality of assay processing tubes. Each assay processing tube includes a right arm having an opening for receiving a reagent and a left arm having an opening. The assay processing tube assembly is driven to rotate. The reagent tube holder has a plurality of arms. Each arm is configured to hold a set of a plurality of reagent tubes. The number of reagent tubes in each set of reagent tubes corresponds to the number of assay processing tubes of the assay processing tube assembly. The reagent tube holder is driven to rotate. The magnet assembly includes a plurality of magnets secured on a magnet holder. The number of magnets corresponds to the number of assay processing tubes. The magnet assembly is driven to move vertically. The controller is configured to control coordinated movements of the assay processing tube assembly, the reagent tube holder, and the magnet assembly to perform an assay processing sequence.

In still another example, an assay automation system includes an assay processing tube assembly of a pre-configured shape, a reagent cartridge assembly, a magnet assembly, and a controller. The assay processing tube assembly includes one or more assay processing tubes. The reagent cartridge assembly has one or more fluidic channels. Each fluidic channel is configured to hold specific reagents, either in liquid, dried or lyophilized form. The reagent cartridge assembly is connected to the assay processing tube assembly. Each assay processing tube has a reaction chamber in the center position, a waste chamber attached to one end of the reaction chamber and a measurement chamber attached to the other end. Each fluidic channel has a reagent outlet through which the reaction chamber can receive a reagent from the fluidic channel or directly from a user's pipette, or other source. The assay processing tube assembly is driven to rotate. The magnet assembly includes a plurality of magnets secured on a magnet holder. The number of magnets corresponds to the number of assay processing tubes. The magnet assembly is driven to move vertically. The controller is configured to control coordinated movements of the assay processing tube assembly, the reagent cartridge assembly, and the magnet assembly to perform an assay processing sequence.

In a different example, a method for automated assay processing is disclosed. A first solution with a first reagent and magnetic beads transferred from a reagent tube is received by a U-shaped assay processing tube in an upright position. The U-shaped assay processing tube has a right arm having an opening for receiving the first solution with the first reagent and magnetic beads and a left arm having an opening. The U-shaped assay processing tube is rotated back and forth within a predefined angle range at specific rotational speeds and the reagents and magnetic beads are mixed A magnet is moved from a lower position to an upper position close to the magnetic beads inside the U-shaped assay processing tube. The U-shaped assay processing tube is rotated clockwise until touching a drain platform. The magnetic beads are concentrated in the U-shaped assay processing tube near the top of the magnet and the first solution with unbound first reagent flows out of the U-shaped assay processing tube. The U-shaped assay processing tube is rotated counterclockwise back to the upright position. The magnet is moved from the upper position back to the lower position. A second solution with a second reagent transferred from a reagent tube is received by the U-shaped assay processing tube. The magnet is moved from the lower position to the upper position close to the magnetic beads inside the U-shaped assay processing tube. The U-shaped assay processing tube is rotated counterclockwise.

In another different example, a method for automated reagent dispensing and mixing is disclosed. A first reagent from a first dispenser is received by a first reagent tube of a plurality of reagent tubes being held in a tube holder. The first reagent tube contains a first solution. The tube holder is rotated counterclockwise to a position where a mixture of the first reagent and the first solution flows out of the first reagent tube into a receiving tube and a second reagent tube is ready to receive the first reagent from the first dispenser. The second reagent tube contains a second solution. The first reagent from the first dispenser is received by the second reagent tube. The tube holder is rotated counterclockwise to a position where a mixture of the first reagent and the second solution flows out of the second reagent tube into the receiving tube. The tube holder is rotated clockwise to a position where a third reagent tube is ready to receive a second reagent from a second dispenser. The third reagent tube is empty or contains a third solution. The second reagent from the second dispenser is received by the third reagent tube. The tube holder is rotated counterclockwise to a position where the second reagent or a mixture of the second reagent and the third solution flows out of the third reagent tube into the receiving tube.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIGS. 14-1, 14-2, 14-3, 14-4, 14-5, 14-6, 14-7, 14-8, 14-9, 14-10, and 14-11 illustrate a set of typical actions of the automated assay processing system of FIG. 12 via coordinated magnet movement and assay processing tube rotation, the assay processing tube having an electrode attached.

FIGS. 15-1, 15-2, 15-3, 15-4, 15-5, 15-6, 15-7, 15-8, 15-9, and 15-10 illustrate another set of typical actions of the automated assay processing system of FIG. 12 via coordinated magnet movement and assay processing tube rotation, the assay processing tube having a different shape and having no electrode attached.

FIGS. 16-1, 16-2, 16-3, 16-4, 16-5, and 16-6 illustrate the major components of an exemplary automated reagent transferring system, in isometric and exploded view, according to various embodiments of the present disclosure.

FIG. 17 FIGS. 17-1, 17-2, 17-3, 17-4, 17-5, and 17-6 illustrates a set of typical actions of the automated reagent transferring system of FIGS. 16-1, 16-2, 16-3, 16-4, 16-5, and 16-6 including dispensing solution into a reagent tube and decanting solution from a reagent tube.

FIG. 18 illustrates the major components of an exemplary assay automation system, in isometric view, according to various embodiments of the present disclosure, the assay automation system being a combination of the automated assay processing system shown in FIG. 12 and the automated reagent transferring system shown in FIGS. 16-1, 16-2, 16-3, 16-4, 16-5, and 16-6.

Figure 1:
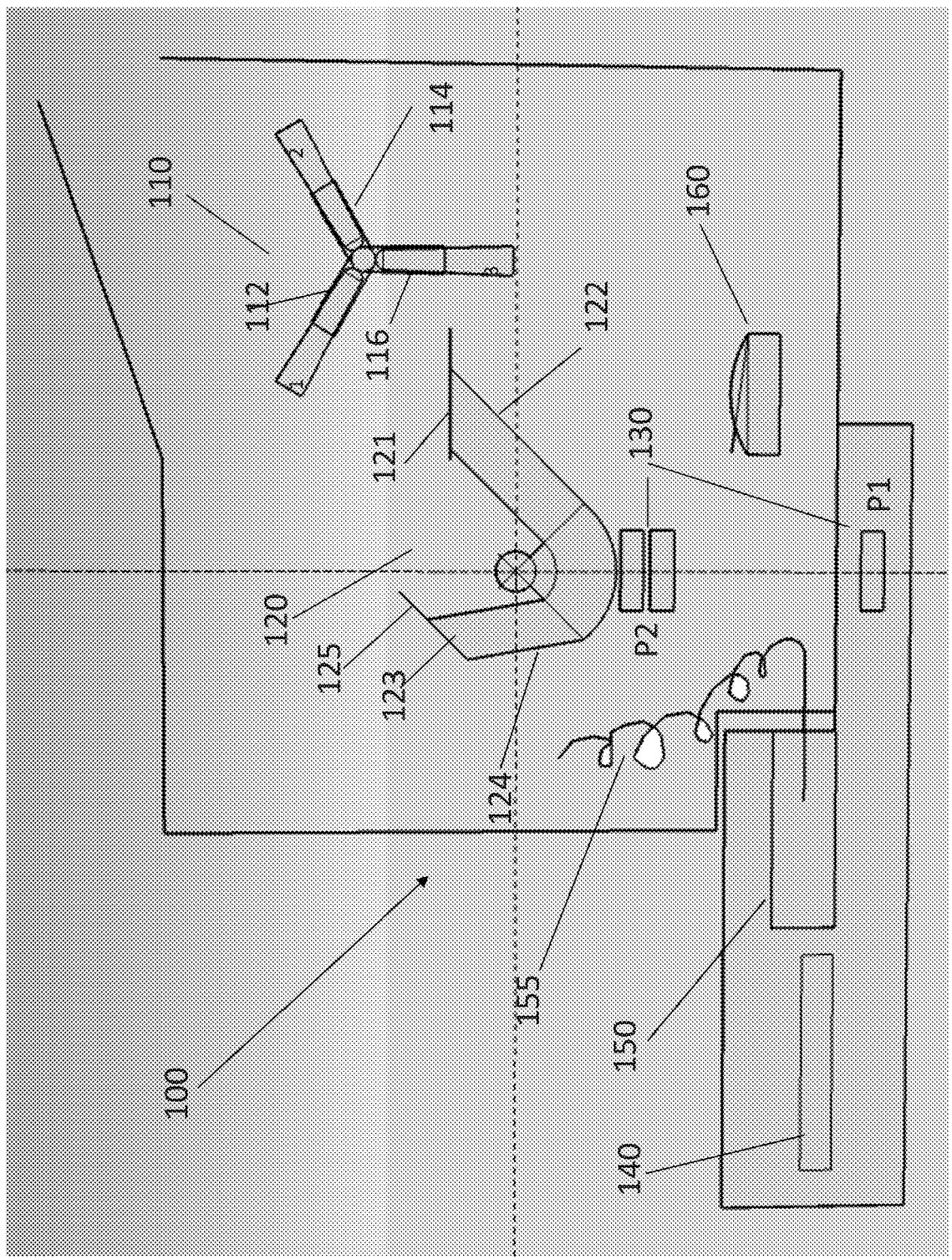
FIG. 1 illustrates a schematic diagram of an exemplary assay automation system, according to some embodiments of the present disclosure.

Embodiments of the present disclosure will be described with reference to the accompanying drawings.

DETAILED DESCRIPTION

Although specific configurations and arrangements are discussed, this should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various embodiments in accordance with the present disclosure use self-designed components and robotics to automate (sample-in, answer-out) assay pipeline including analyte capture, labeling, wash, and detection. Compared to other alternatives (e.g., microfluidics, acoustic), robotics would be easier to implement and debug, and cost-effective for production. In some embodiments, the system disclosed herein includes an automated magnetic assay subsystem that utilizes clockwise (and counter-clockwise) rotations of reaction vessels and coordinated linear movements of magnets to manipulate magnetic beads (MB) and other reagents. The automated magnetic assay subsystem can achieve automatic reagent mixing, incubation, magnetic separation, electrochemical reaction, and measurement. In some embodiments, the system disclosed herein includes an automated reagent processing subsystem that utilizes dispensers and clockwise (and/or counterclockwise) rotations of reaction tubes to mix and decant reagents sequentially. The systems and methods disclosed herein can be used in different applications, such as in the fields of biotechnology, biochemistry, and biomedicine.

FIG. 1 illustrates a schematic diagram of major components of an exemplary assay automation system 100, according to some embodiments of the present disclosure. The assay automation system 100 can include a reagent tube holder 110, an assay processing tube 120, a magnet 130, and a controller 140.

The reagent tube holder 110 has three arms 112, 114, 116 separated at 120 degrees. Each arm 112, 114, 116 can hold a reagent tube 1, 2, 3 respectively (see also FIG. 2). A motor, such as a stepper motor, (not shown) can be coupled with the reagent tube holder 110 and can rotate it freely. An additional arm is possible with different configurations, e.g., different angles between adjacent arms.

In some embodiments, the assay processing tube 120 is a U-shaped tube. Namely, the assay processing tube 120 has a right arm 122 and a left arm 124 that form an approximately a U-shape. The U-shape can be symmetric or asymmetric. The right arm 122 of the assay processing tube 120 is the drain arm, which has a diagonal opening 121. Through this opening, the drain arm 122 can receive reagent transferred from the reagent tube 1, 2, 3 in the upper area. An electrode, such as a screen-printed electrode (SPE) 125, can be fixed to the opening 123 of the left arm 124. The SPE 125 can be connected to a printed circuit board (PCB) 150 via a cable, such as a long belt cable 155. A motor, such as a stepper motor (not shown) can be coupled with the assay processing tube 120 and can rotate it freely.

The magnet 130 can be installed on a rectangle bar (not shown), which can be driven by a motor, such as a stepper motor (not shown) to move vertically from a lower position P1 to an upper position P2.

In some embodiments, the controller 140 is configured to control coordinated movements of the reagent tube holder 110, the assay processing tube 120, and the magnet 130 to perform an assay processing sequence. The controller 140 can be, for example, a stepper driver chip used along with corresponding peripheral circuits to control the stepper motors. A microcontroller can be programmed to coordinate all the automation sequences.

Figure 2B:
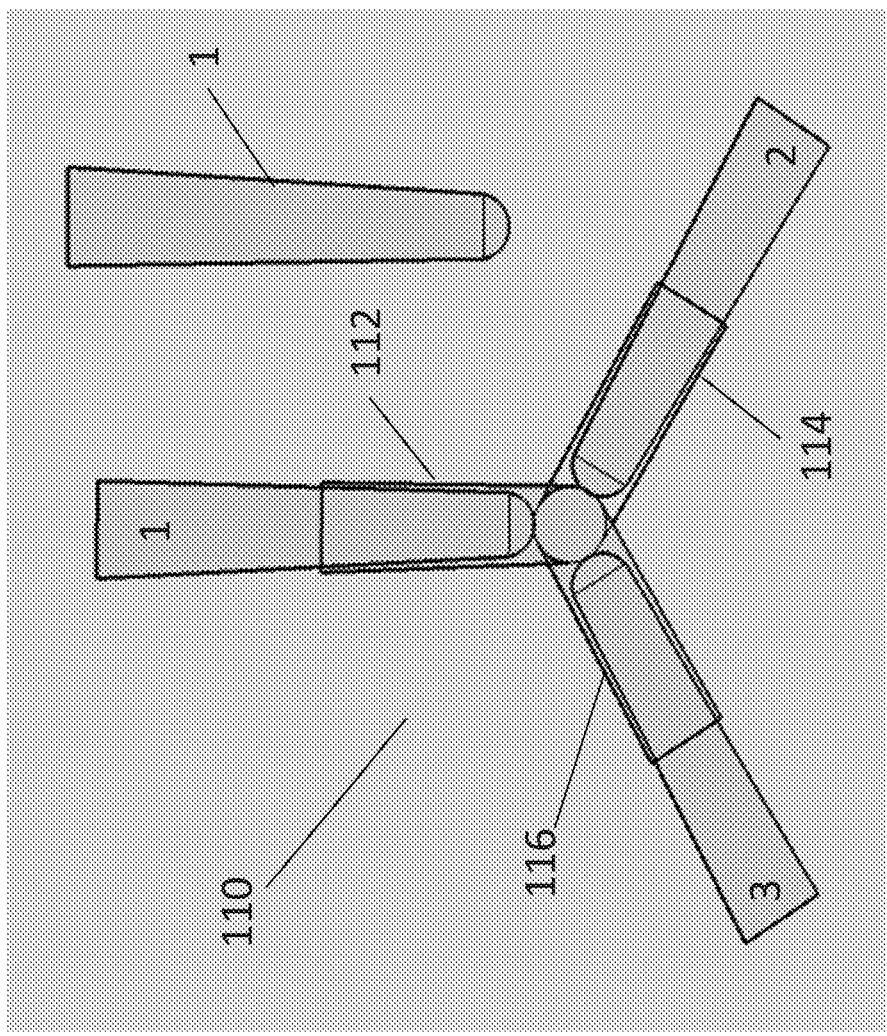
FIG. 2b illustrates a schematic diagram of an exemplary reagent tube holder with reagent tubes inserted therein, according to some embodiments of the present disclosure.
Figure 2A:
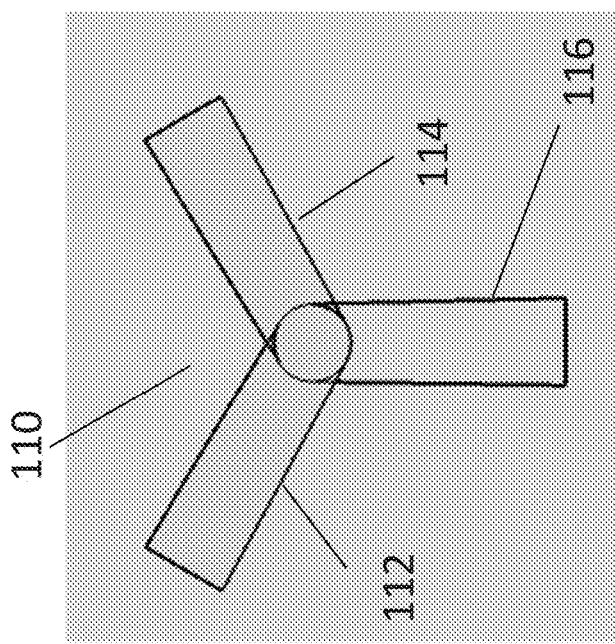
FIG. 2a illustrates a schematic diagram of an exemplary reagent tube holder without reagent tubes inserted therein, according to some embodiments of the present disclosure.

FIG. 2a illustrates a schematic diagram of an exemplary reagent tube holder 110 without reagent tubes inserted therein, while FIG. 2b illustrates a schematic diagram of an exemplary reagent tube holder 110 with reagent tubes 1, 2, 3 inserted therein.

Figure 3:
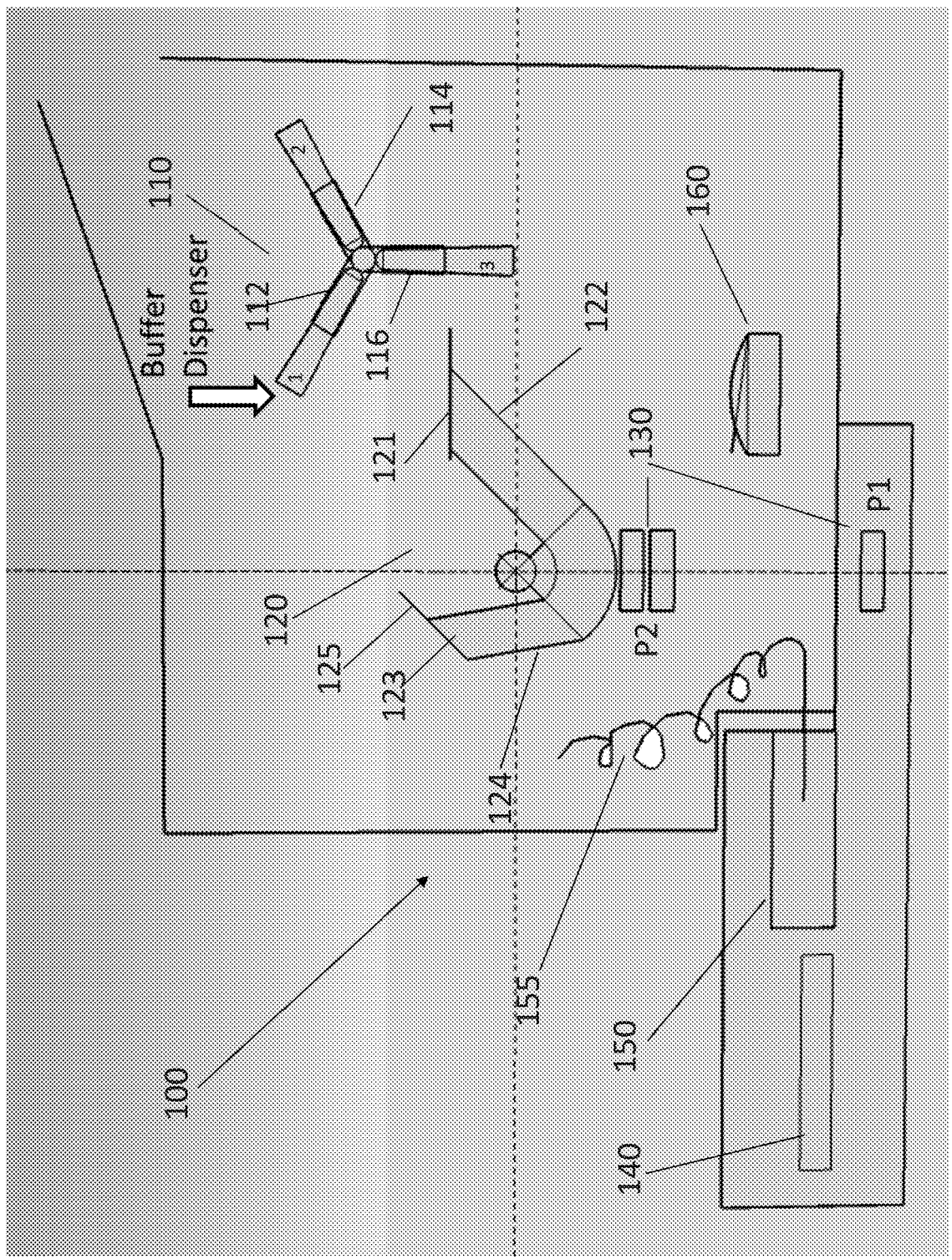
FIGS. 3-11 illustrate various exemplary assay processing steps, according to various embodiments of the present disclosure.

FIGS. 3-11 illustrate various exemplary assay processing steps. As shown in FIG. 3, at the initial state, the magnet 130 is at the lowest position P1. The assay processing tube 120, the reagent tube holder 110 and three reagent tubes 1, 2, 3 are pre-installed, according to some embodiments. The rotation angles of the assay processing tube 120 and the reagent tube holder 110 can be pre-locked as shown in FIG. 3. The user can use a pipette to add sample directly to the assay processing tube 120. After the sample is added and the pre-lock is released, all the following steps can be automated.

The assay automation can be achieved by controlling the stepper motors, which drive the magnet 130 vertically, and rotate the assay processing tube 120 and the reagent tube holder 110.

The assay automation system 100 can perform various kinds of assay pipelines. As an example, its usage using the automated magnetic electronic sensing (iMES) assay pipeline will be demonstrated. The iMES assay includes analyte capture, labeling, wash, and detection steps. In the beginning, the reagent tube 1 contains magnetic beads (MB) and is sealed; the reagent tube 2 contains concentrated (or lyophilized) antibody and is sealed; the reagent tube 3 is empty and not sealed. Before being transferred to the assay processing tube 120, the MB and the antibody can each be diluted using dilution buffer from a dispenser.

Figure 4:
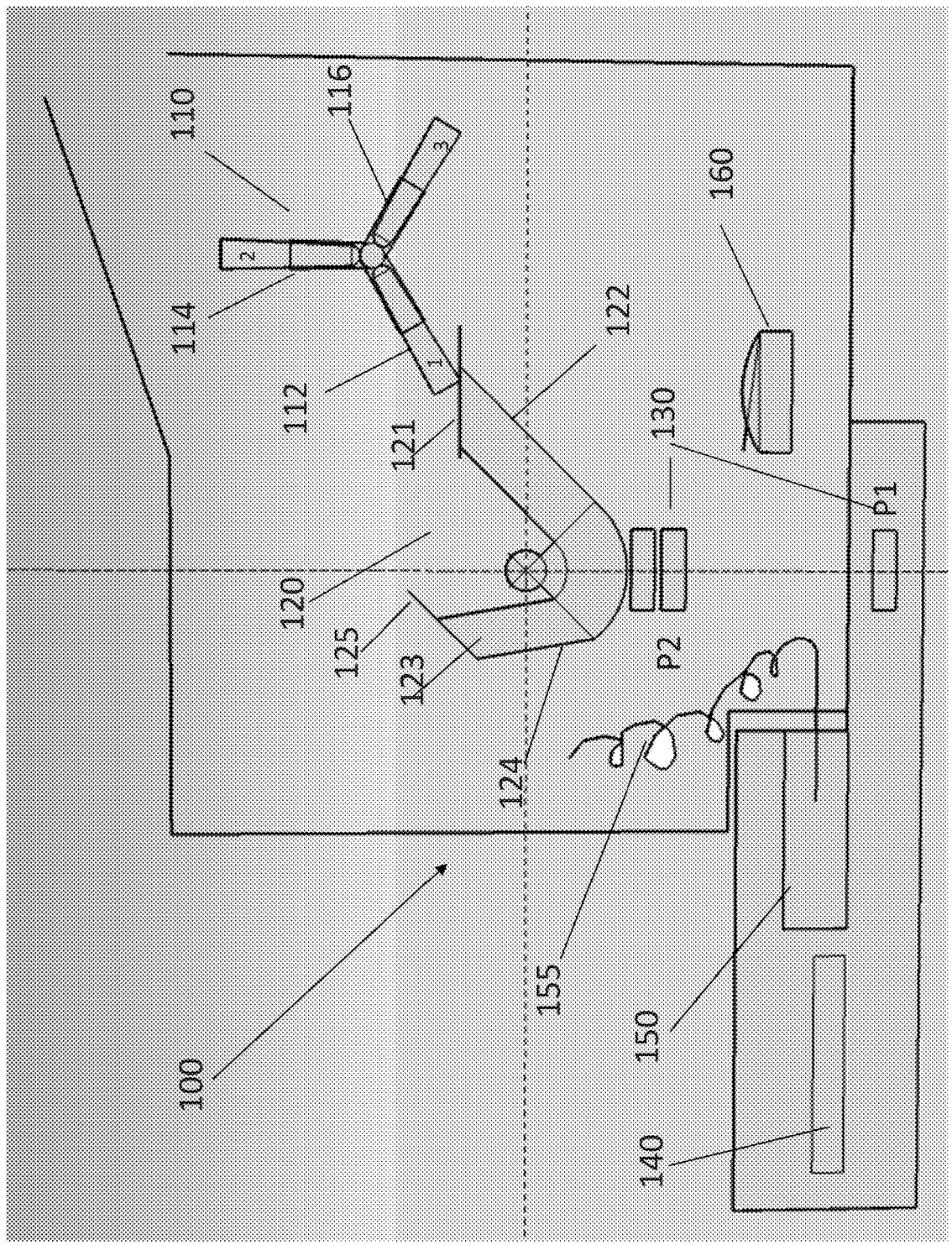

In the analyte capture step, a dispenser (FIG. 3, dispenser not shown) dispenses buffer into the reagent tube 1 to dilute the MB. After the reagent tube 1 is diluted/mixed, the reagent tube holder 110 is slowly rotated until the reagent tube 1 touches the assay processing tube 120 (FIG. 4). The reagent tube holder 110 can knock the assay processing tube 120 one or more times so that most of the reagent in the reagent tube 1 can break surface tension and be transferred into the assay processing tube 120. This step transfers the MB from the reagent tube 1 to the assay processing tube 120, and the MB can capture the analyte in the sample. To achieve better capture results, the assay processing tube 120 can be rotated back and forth within a predefined angle range (such as around 10-30 degrees) at specific rotational speeds (such as alternating between 240 RPM and 90 RPM) to help mixing MB with the sample.

Figure 5:
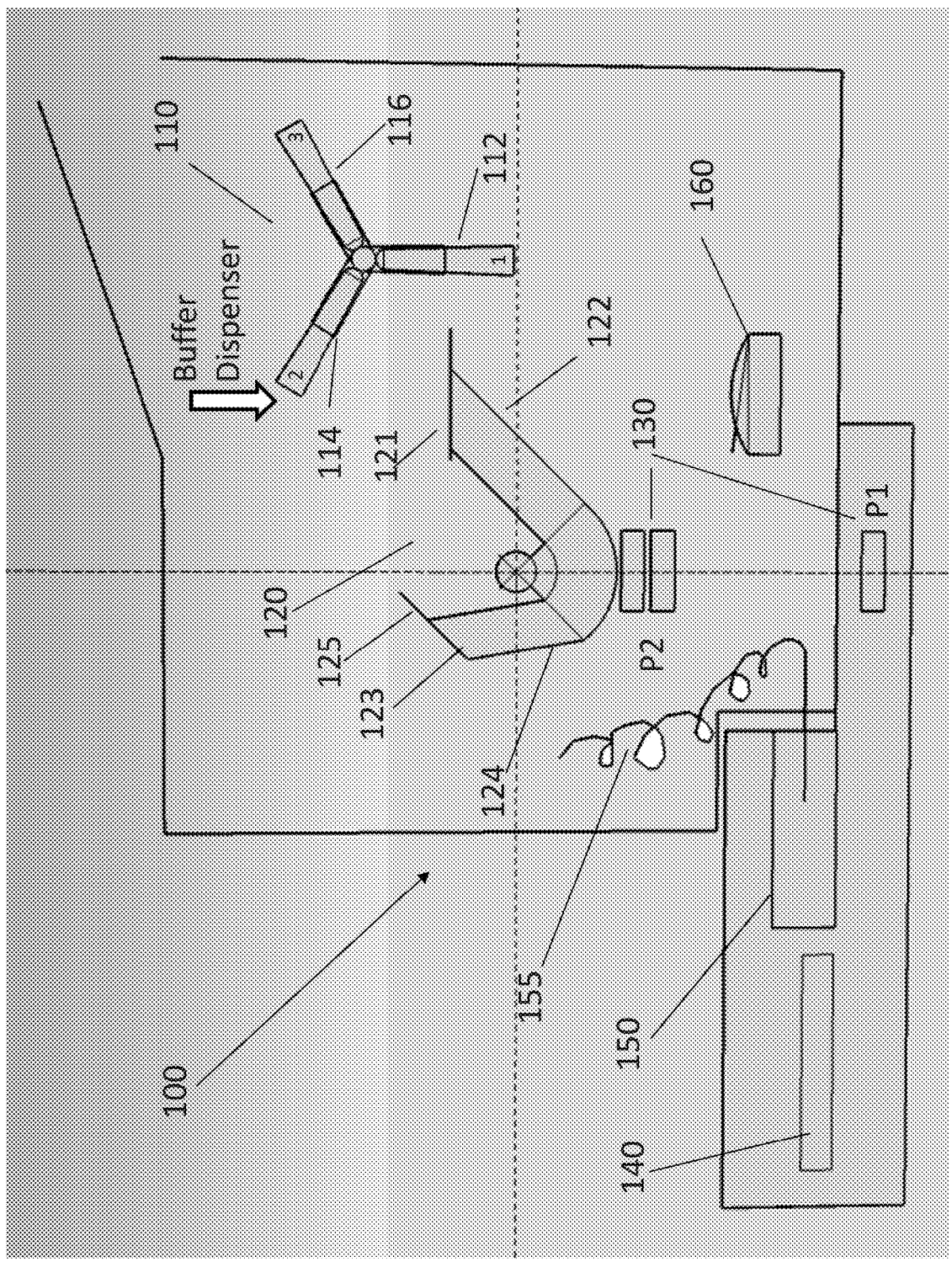

In the labeling step, the reagent tube holder 110 is rotated to a position as shown in FIG. 5 and a dispenser (not shown) dispenses buffer into the reagent tube 2. This buffer dilutes the antibody in the reagent tube 2.

Figure 6:
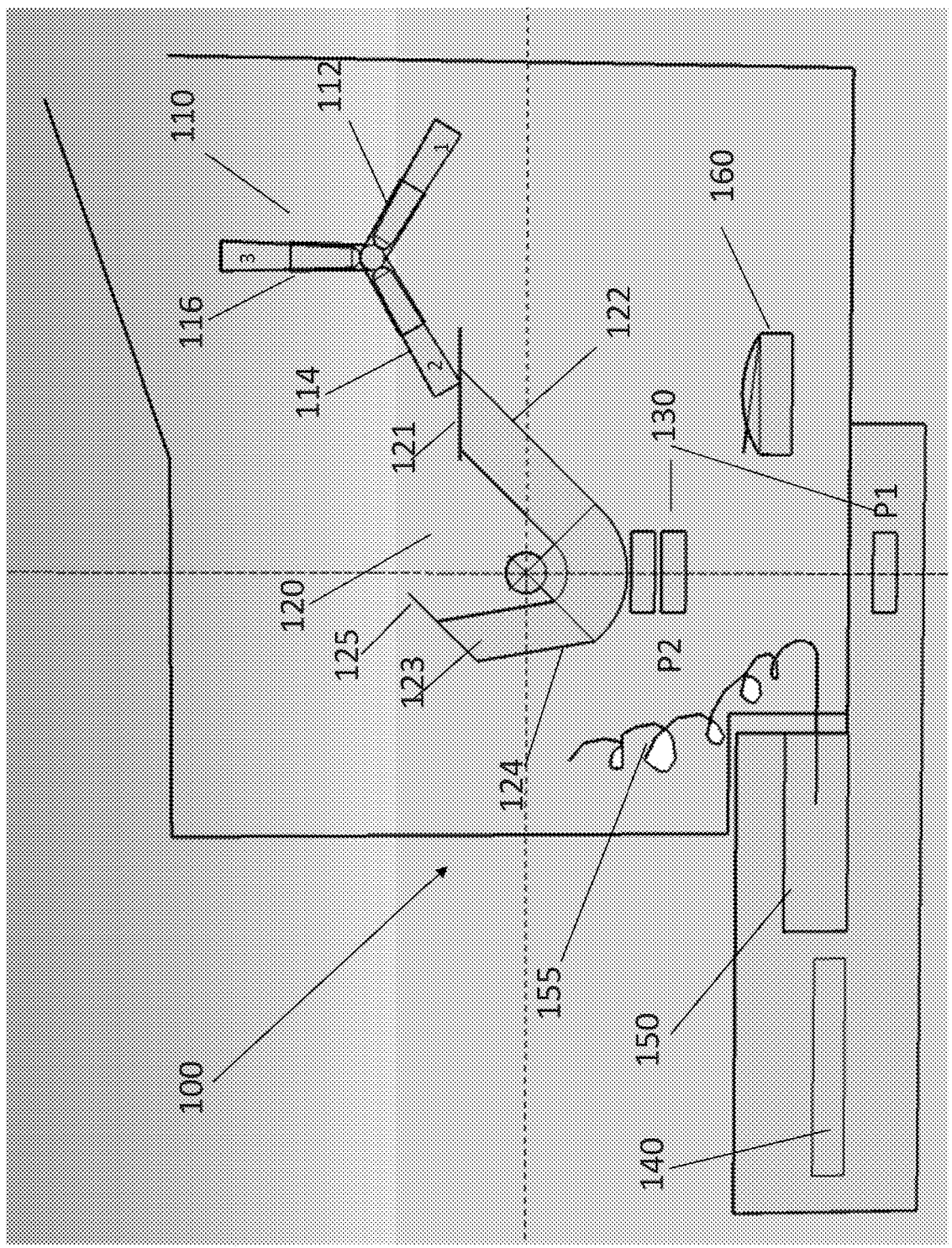

After the reagent tube 2 is diluted/mixed, the reagent tube holder 110 is slowly rotated until the reagent tube 2 touches the assay processing tube 120 (FIG. 6). The reagent tube holder 110 can knock the assay processing tube 120 one or more times so that most of the reagent in the reagent tube 2 can break surface tension and be transferred into the assay processing tube 120. This step transfers the antibody from the reagent tube 2 to the assay processing tube 120. The analyte in the assay processing tube 120 can be labeled by the antibody. To achieve better labeling results, the assay processing tube 120 can be rotated back and forth within a predefined angle range at specific rotational speeds to facilitate mixing.

Figure 7:
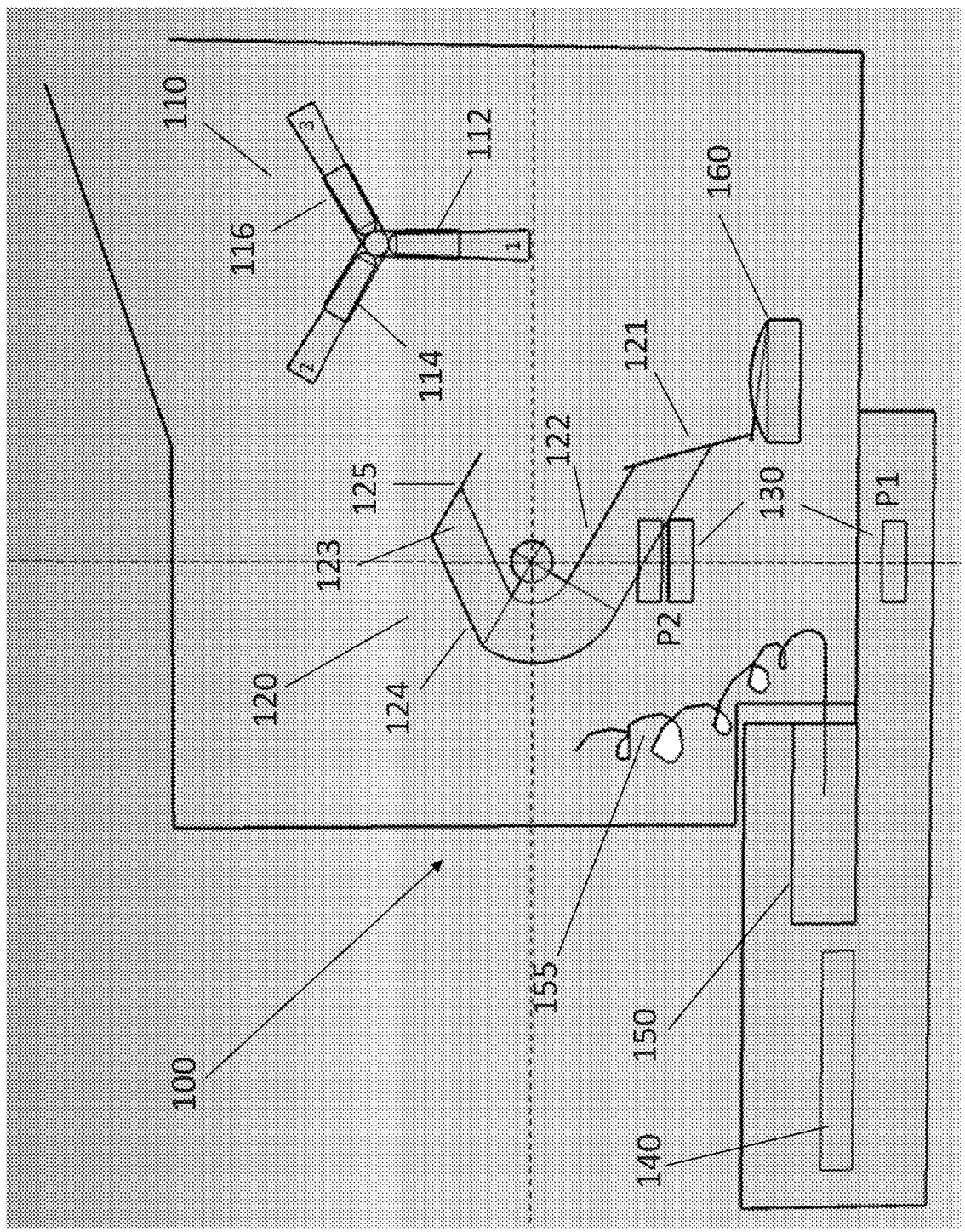
Figure 8:
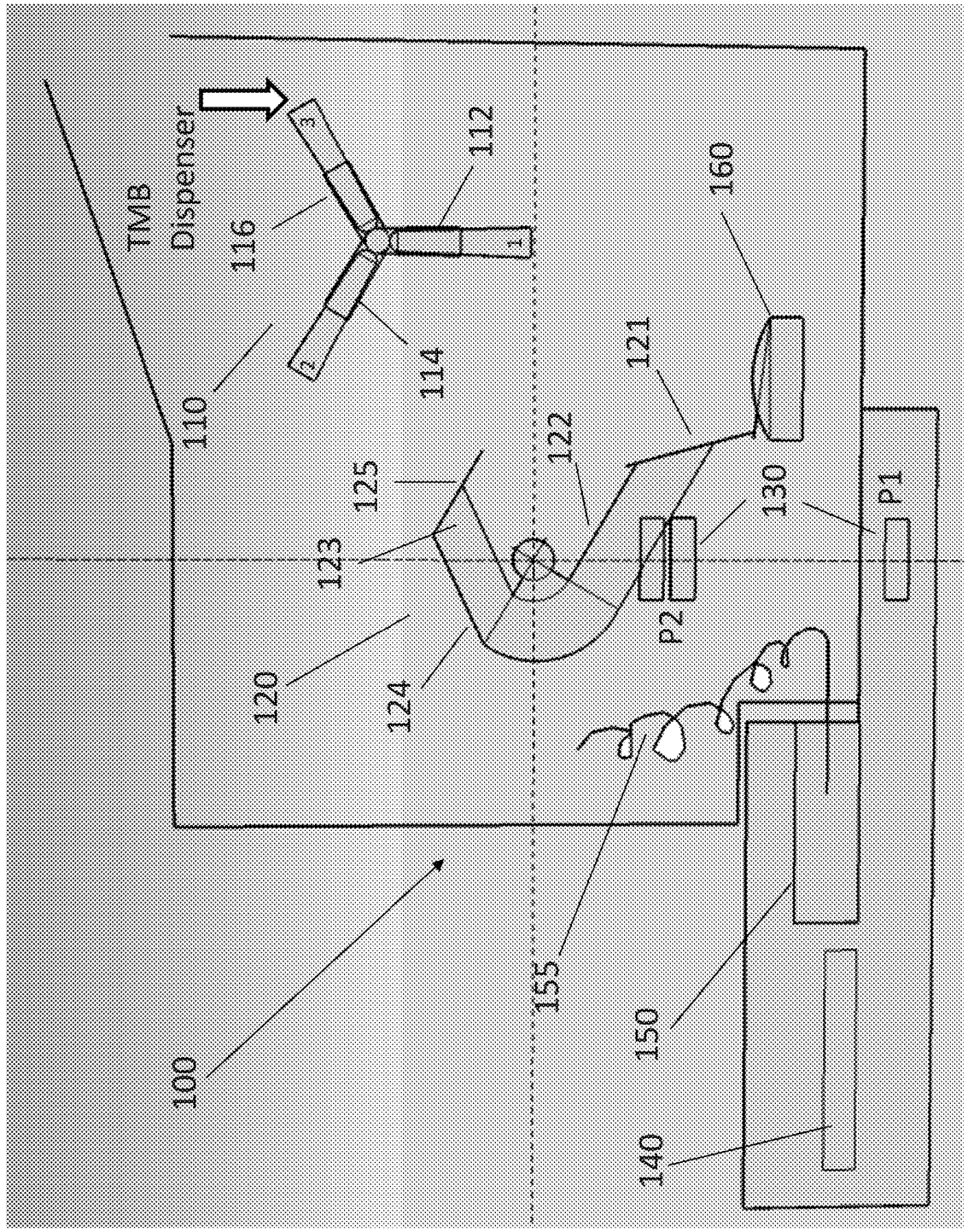

One or several magnetic washes can be performed after labeling. Prior to the wash step, the MB can be retained by the magnet 130 to avoid loss. This is achieved by coordinated movements of the magnet 130 and the assay processing tube 120. The assay processing tube 120 rotation can stop when it touches the drain platform 160 (see FIG. 7). The MB can be concentrated in the assay processing tube 120 near the top of the magnet 130. Solution with unbound reagents can flow out of the assay processing tube 120 during this draining process. The absorbent material on the drain platform 160 can further help the draining. Once draining is completed, the assay processing tube 120 and the magnet 130 can return to their original positions. Depending on the situation, the wash step can be repeated multiple times by iterating the steps as shown in FIGS. 5, 6, and 7.

Figure 9:
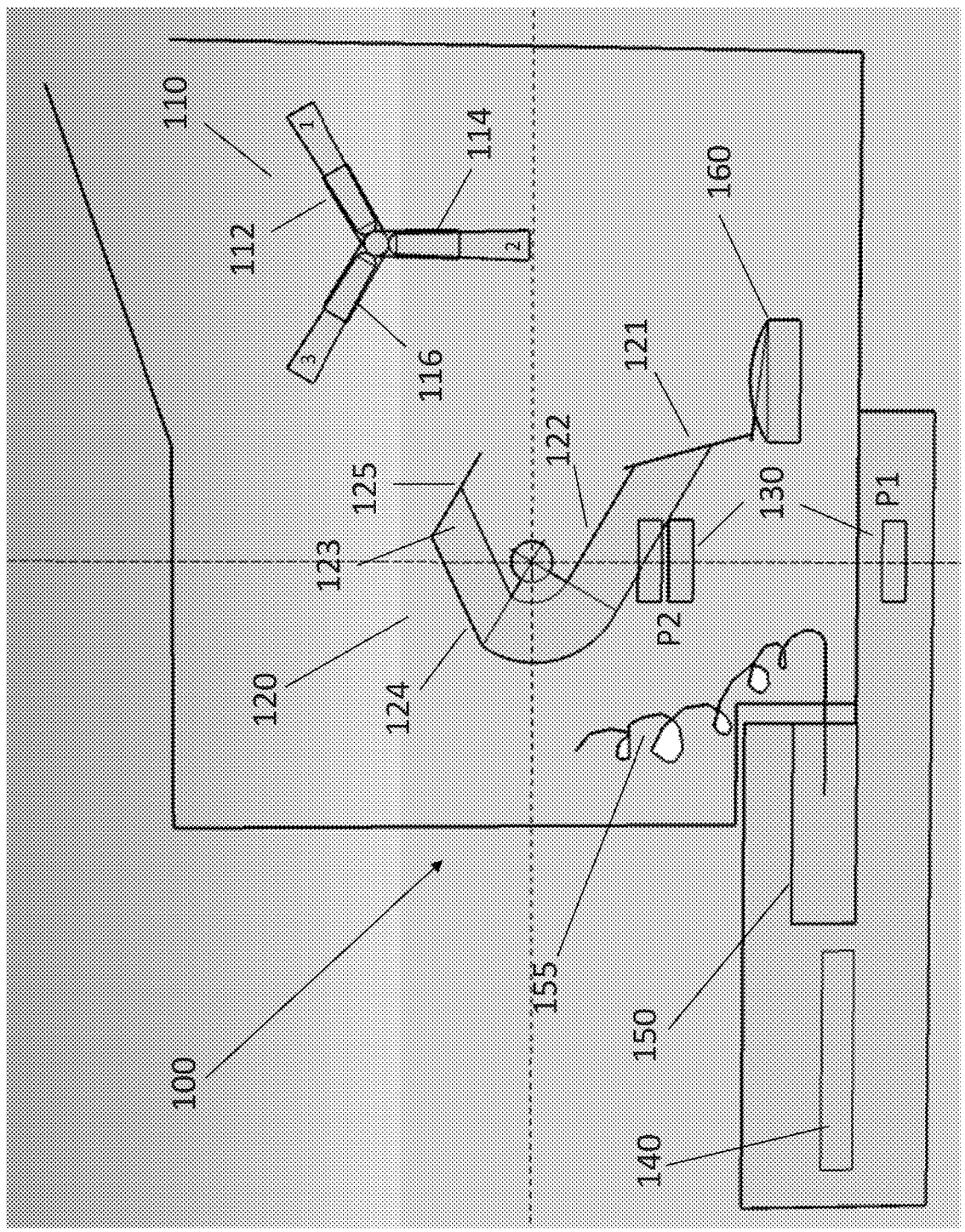
Figure 10:
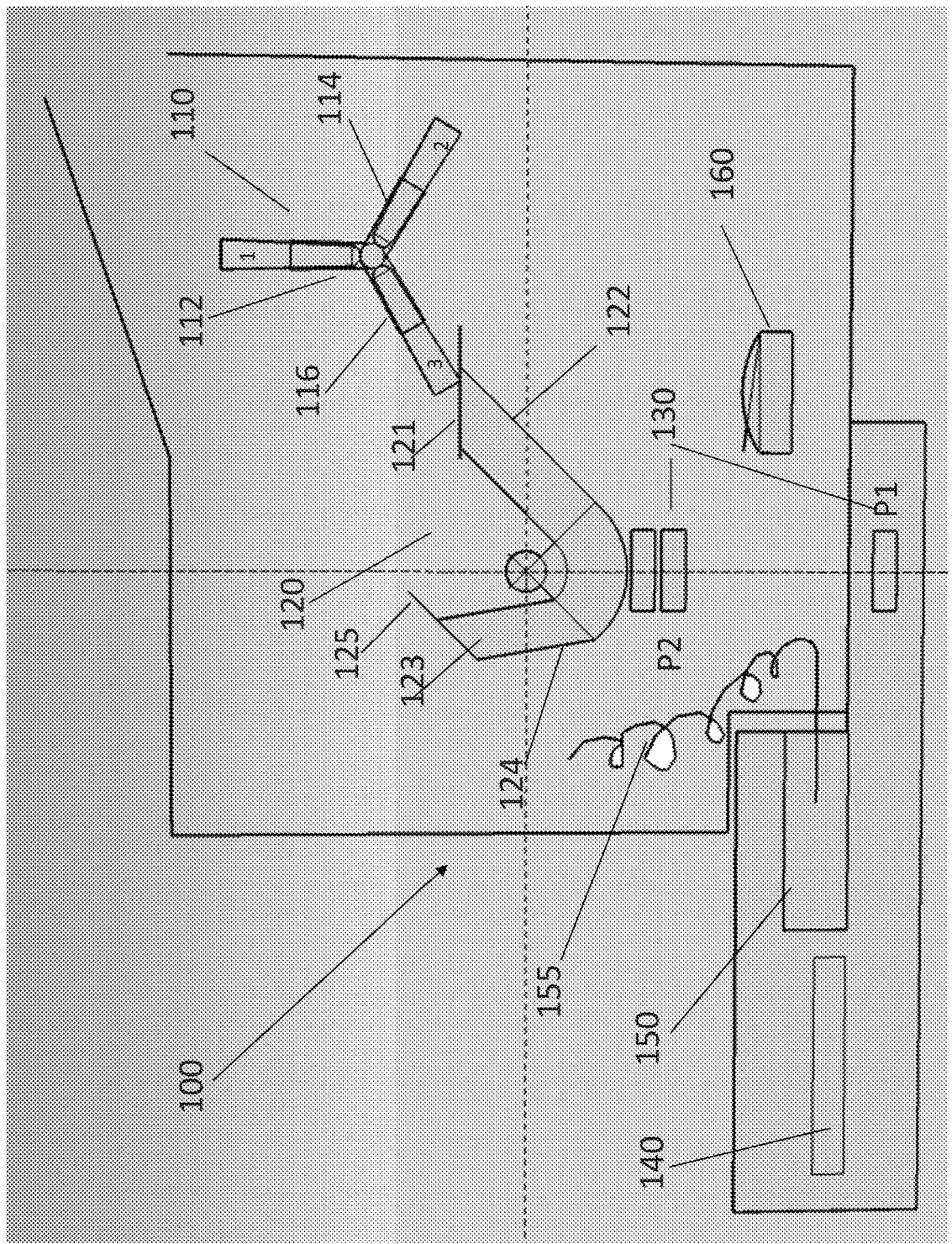

To initiate the detection step, an electron mediator, such as TMB (3,3',5,5'-tetramethylbenzidine), can be dispensed (FIG. 8) to the empty reagent tube 3. The reagent tube 3 is rotated to the position as shown in FIG. 9 and then transfers TMB to the assay processing tube 120 (FIG. 10) similar to previous transfer steps.

Figure 11:
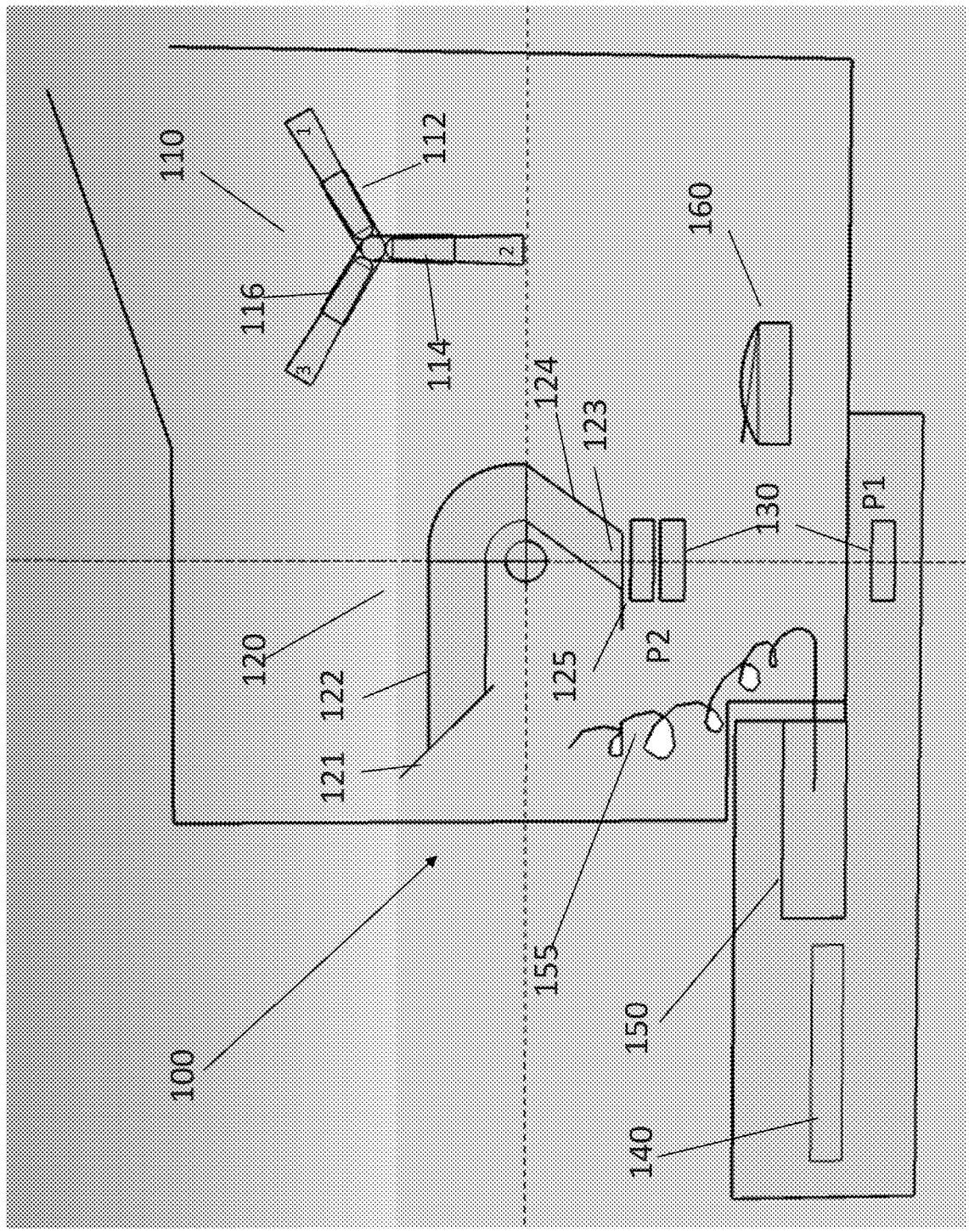

The assay processing tube 120 can then be rotated counterclockwise until the SPE 125 become horizontal (see FIG. 11). Simultaneously, the magnet 130 is raised to the upper position and concentrate the beads onto the working electrode. The electrical current generated from the reduction-oxidation reaction can be measured automatically.

Although the iMES assay pipeline is used to describe how the automation system is used, the automation steps can be customized to support other sequences. Different combinations of analyte capture, labeling, wash and detection steps can achieve similar sample-in and answer-out automation.

FIGS. 12-19 illustrate an exemplary automated assay processing system, an automated reagent transferring system, and an exemplary assay automation system, which is a combination of the automated assay processing system and the automated reagent transferring system. These systems utilize clockwise and counterclockwise rotations of reaction vessels and coordinated linear movements of magnets to manipulate the magnetic beads (MB) and other reagents. These systems can achieve automatic reagent mixing, incubation, magnetic separation, electrochemical reaction, and measurement, etc. The present invention can be used in different applications, especially in the fields of biotechnology, biochemistry, and biomedicine.

Figure 12:
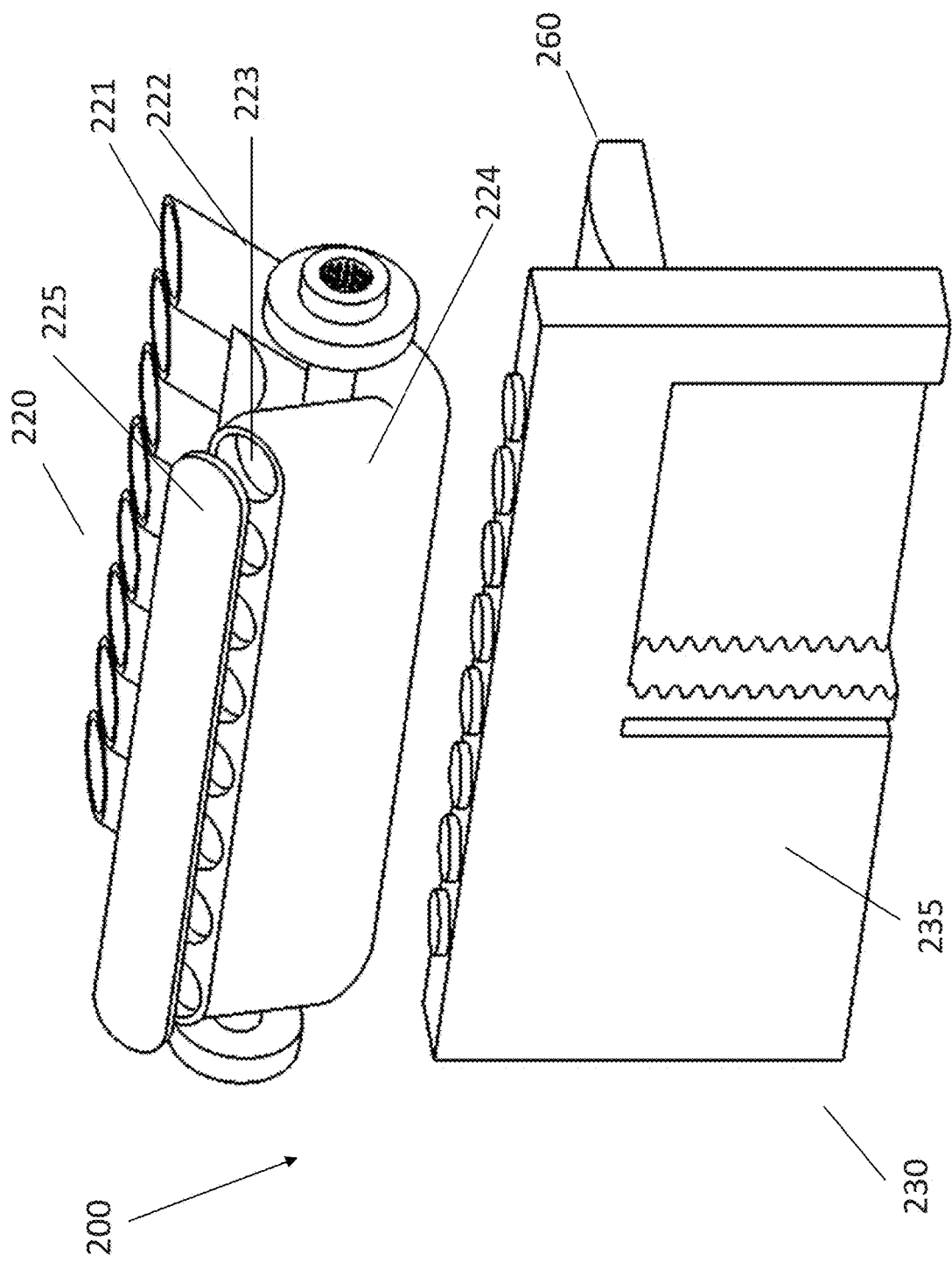
FIG. 12 illustrates the major components of an exemplary automated assay processing system, in isometric view, according to various embodiments of the present disclosure.
Figure 13:
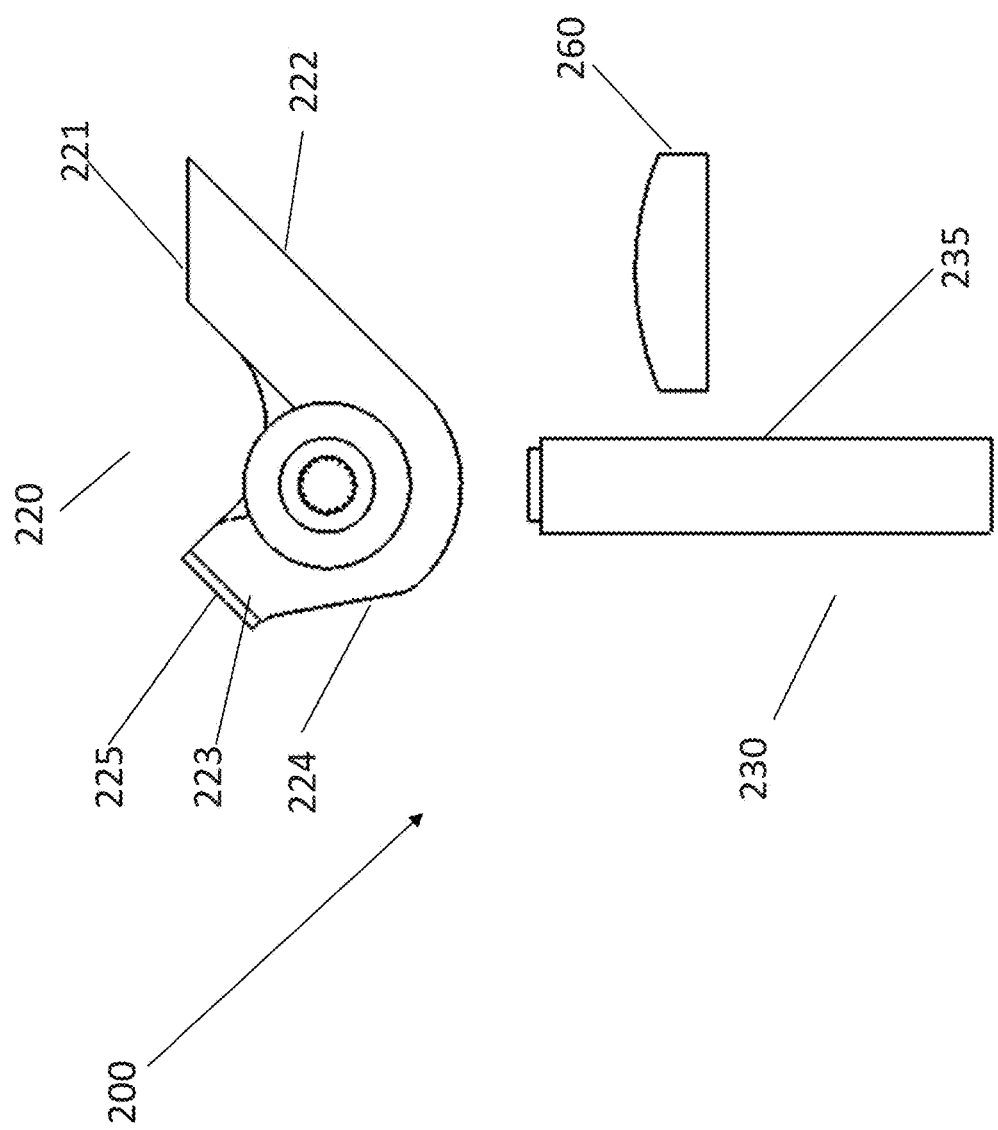
FIG. 13 illustrates the major components of the exemplary automated assay processing system of FIG. 12, in front view, according to various embodiments of the present disclosure.

FIGS. 12-13 illustrate the major components of an exemplary automated assay processing system 200, which include an assay processing tube assembly 220, a magnet assembly 230, and a drain platform 260. The assay processing tube assembly 220 can have a plurality of assay processing tubes (eight shown in FIG. 12). Each assay processing tube can include a right arm 222 having a diagonal opening 221 for receiving a reagent and also decanting solution in the tube and a left arm 224 having an opening 223. An electrode 225, such as a SPE, can be fixed to the opening 223 of the left arm 224. Through the diagonal opening 221, the right arm 222 can receive a reagent from a dispenser or directly from a user's pipette, or other source. The assay processing tube assembly is driven by a stepper motor (not shown) to rotate. The assay processing tube assembly can be of a special shape (FIG. 12 shows a U-shape, but other shapes such as V, N, W, L, C, etc. are also possible).

The magnet assembly 230 can include a plurality of magnets secured on a magnet holder 235. The number of magnets (eight shown in FIG. 12) corresponds to the number of assay processing tubes. The magnet assembly 230 is driven by a stepper motor (not shown) to move vertically.

FIG. 12 shows eight duplicates of arms and magnets along the axis direction, but other numbers of duplicates, such as 2, 16, etc. are also possible.

A stepper driver chip can be used along with corresponding peripheral circuits to control the stepper motors. A microcontroller can be programmed to coordinate all the automation sequences.

As an example, the application of the automated assay processing system in sequencing sample preparation and automated cleanup and size selection will be described. For this application, the SPE is not used and a different assay processing tube, whose left arm is symmetric to the right arm, is used (see FIGS. 15-1, 15-2, 15-3, 15-4, 15-5, 15-6, 15-7, 15-8, 15-9, and 15-10). This application can include the following steps:

1. Add a binding buffer solution with magnetic beads in the assay processing tube FIG. 15-1).
2. Transfer a DNA sample to an assay processing tube and mix it with the magnetic beads and the binding buffer solution.
3. Incubate at RT for 10 minutes with back and forth rotation within a predefined angle range at specific rotational speeds.
4. Raise the magnet and collect the magnetic beads with the magnet. Rotate the assay processing tube clockwise to decant unbind reagent (FIGS. 15-1, 15-2, 15-3, and 15-4). Restore the assay processing tube after the decanting (FIGS. 15-4, 15-5, 15-6, and 15-7).
5. Add a wash solution (supplemented with ethanol). Mix by back and forth rotation within a predefined angle range at specific rotational speeds and collect the magnetic beads by the magnet. When the solution clears, raise the magnet again, and rotate tubes to decant the wash solution (FIGS. 15-1, 15-2, 15-3, 15-4, 15-5, 15-6, and 15-7).
6. Repeat step 5.

During the last wash step, keep the assay processing tube at the decant position (FIG. 15-4) for two more minutes to drain the residual wash solution.

8. Rotate the tube counterclockwise to the reagent loading position (FIGS. 15-4, 15-5, 15-6, and 15-7), air dry the magnetic beads at room temperature for 5 minutes or until there are no droplets of the wash solution left on the walls of the assay processing tube.
9. Add an elution buffer.
10. Mix by rotating the assay processing tube with motors back and forth within a predefined angle range at specific rotational speeds.
11. Raise the magnet (FIGS. 15-7 and 15-8) to collect the magnetic beads. Rotate the assay processing tube counterclockwise (FIGS. 15-8, 15-9, and 15-10) to transfer the eluate without magnetic beads to a storage tube (not shown).

As another example, the application of the system and method of the present invention in automated negative isolation (cell depletion) will be described.

For this application, the SPE is not used. The assay processing tube is prepackaged with customized MB specific to the target cells to be depleted. This application can include the following steps:
1. Add heterogeneous cell mixture to the assay processing tube's right arm to mix with the MB (FIG. 15-1).
2. Incubate at RT for 15 minutes with back and forth rotation within a predefined angle range at specific rotational speeds. Targeted cells to be depleted can bind to the MB.
3. Raise the magnet and collect the MB/cells with the magnet.
4. When the solution is clear, rotate the assay processing tube counterclockwise to decant unbind cells to a new receiving tube (not shown) via the left arm opening (FIGS. 15-8, 15-9, and 15-10).

As still another example, the application of the system and method of the present invention in positive isolation and lysis of targeted cells will be described.

For this application, the SPE is not used. The assay processing tube is prepackaged with customized MB specific to the target cells. This application can include the following steps:
1. Add heterogeneous cell mixture to the assay processing tube's right arm to mix with the MB (FIG. 15-1).
2. Incubate at RT for 15 minutes with back and forth rotation within a predefined angle range at specific rotational speeds.
3. Raise the magnet and collect the MB with the magnet. Rotate the assay processing tube clockwise to decant unbind cells and solution (FIGS. 15-1, 15-2, 15-3, and 15-4). Restore the assay processing tube after the decanting (FIGS. 15-4, 15-5, 15-6, and 15-7).
4. Add a wash solution to the assay processing tube's right arm. Mix by intermittent tube shaking and collect the MB by the magnet. When the solution clears, raise the magnet again and rotate the assay processing tube clockwise to decant the wash solution (FIGS. 15-1, 15-2, 15-3, 15-4, 15-5, 15-6, and 15-7).
5. Add lysis buffer to the assay processing tube's right arm. Mix by intermittent tube shaking and collect the MB by the magnet. When the solution clears, rotate the assay processing tube counterclockwise (FIGS. 15-8, 15-9, and 15-10) simultaneously with the magnet. This can transfer the cell lysis without the MB to a new receiving tube (not shown) via the left arm opening.

Figures 1, 14:
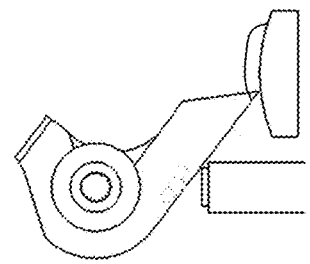
Figures 2, 14:
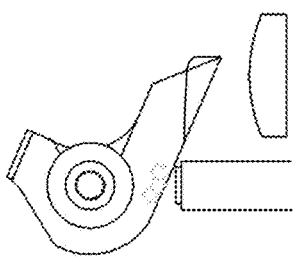
Figures 3, 14:
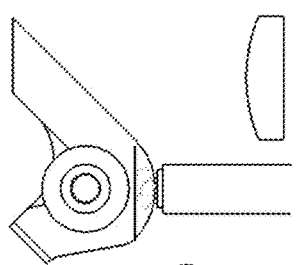
Figures 4, 14:
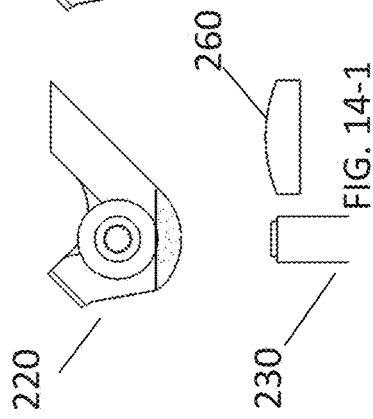
Figures 5, 14:
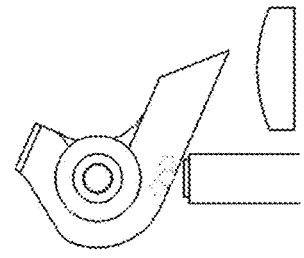
Figures 6, 14:
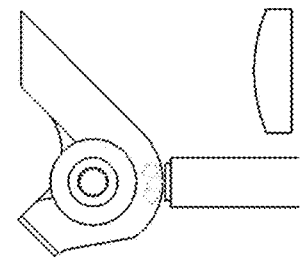
Figures 7, 14:
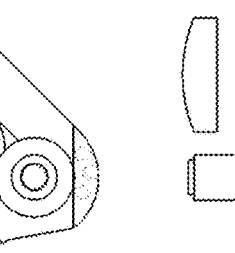
Figures 11, 14:
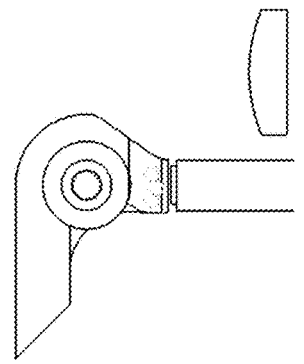
Figures 10, 14:
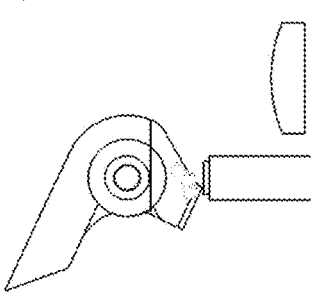
Figures 9, 14:
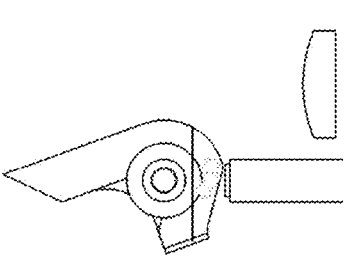
Figures 8, 14:
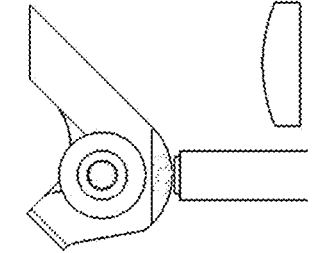

FIGS. 16-1, 16-2, 16-3, 16-4, 16-5, and 16-6 illustrates the major components of an exemplary automated reagent transferring system 300, which can include a reagent tube holder 310 having a plurality of tube-holding arms (three arms 312, 314, 316 separated at 120 degrees shown in FIG. 16-1) and one or more sets of dispensers 370 above the reagent tube holder 310 (shown in FIG. 16-2). Each tube-holding arm 312, 314, 316 is configured to hold a set of a plurality of reagent tubes 315 (eight as shown in FIG. 16-3). The reagent tube holder 310 is driven by a stepper motor (not shown) to rotate. Each set of dispensers 370 has the same number of dispensers (eight as shown in FIG. 16-4) as the number of reagent tubes in each set of reagent tubes 315.

The automated reagent transferring system 300 can utilize dispensers 370 and multiple clockwise or counterclockwise rotations of the reagent tubes 315 to mix and decant reagents sequentially. As shown in FIGS. 16-5 and 16-6, the reagent tube holder 310 has three arms, and each arm can hold eight reagent tubes. Additional arms are possible with different configurations.

A stepper driver chip can be used along with corresponding peripheral circuits to control the stepper motor. The reagent tube holder 310 can rotate and stop at an angle so that a specific dispenser set is just above a specific set of reagent tubes.

As an example, the application of the automated reagent transferring system in automatic mixing of multiple reagents sequentially will be described. In many types of applications, different reagents need to be stored separately and only mixed together prior to experiments. The automated reagent transferring system can automate sequential mixing or dilution of multiple reagents.

For example, the reagent tube 1 contains solution A and is at the angle as shown in FIG. 17-1; the reagent tube 2 contains solution B and the reagent tube 3 is empty. The left set of dispensers is configured to dispense solution C. The right set of dispensers is configured to dispense solution D.

First, the left set dispensers dispense solution C into the reagent tube 1 and mixed with solution A (FIG. 17-1); the reagent tube 1 is then rotated counterclockwise to the angle as shown in FIG. 17-2. Mixture A+C is transferred to a new receiving tube (not shown) that originally contains reagent R.

Subsequently, the reagent tube 2 is rotated clockwise to the angle as shown in FIG. 17-3. The left set dispensers then dispense solution C into the reagent tube 2 and mixed with solution B. The reagent tube 2 is then rotated counterclockwise to the angle as shown in FIG. 15-4. Mixture B+C flows out of the reagent tube 2 and mixed with reagents in the receiving tube (not shown).

Similarly, the reagent tube 3 is rotated clockwise to the angle as shown in FIG. 17-5. The right set dispensers then dispense solution D into the reagent tube 3. The reagent tube 3 is then rotated counterclockwise to the angle as shown in FIG. 15-6. Solution D flows out of the reagent tube 3 and mixed with the reagent in the receiving tube (not shown).

At the last step, the receiving tube contains solution R+A+B+C+D.

The above workflow can be configured for different mixing and dilution protocols.

Figure 19:
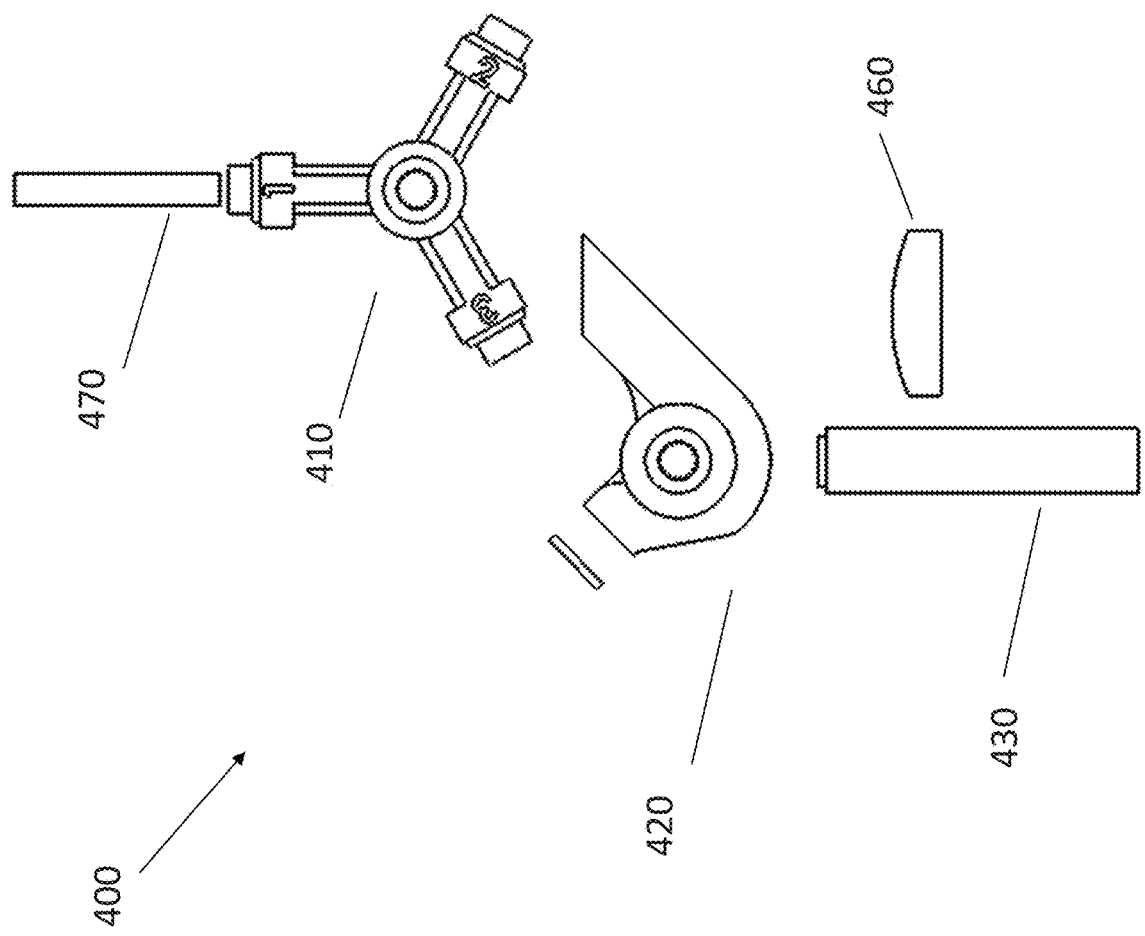
FIG. 19 illustrates the major components of the exemplary assay automation system of FIG. 18, in front view, according to various embodiments of the present disclosure.

FIGS. 18 and 19 show the major components of an exemplary assay automation system 400, which is a combination of the automated assay processing system 200 shown in FIG. 12 and the automated reagent transferring system 300 shown in FIGS. 16-1, 16-2, 16-3, 16-4, 16-5, and 16-6.

As shown, the assay automation system 400 can include an assay processing tube assembly 420 having a plurality of assay processing tubes, a reagent tube holder 410 having a plurality of arms for holding a plurality reagent tubes, a magnet assembly 430, a drain platform 460, and one or more sets of dispensers 470 above the reagent tube holder 410.

Initially, the magnet assembly 430 is at the lowest position. The user can use a pipette to add sample directly to the reagent tubes. After the sample is added, all the following steps are automated. The assay automation is achieved by controlling the stepper motors, which drive the magnet assembly 430 to move vertically, and rotate the assay processing tube assembly 420 and the reagent tube holder 410.

The assay automation system 400 can perform various kinds of assay pipelines. As an example, its usage using the iMES assay pipeline will be demonstrated. As mentioned above, the iMES assay can include analyte capture, labeling, wash, and detection steps. In the beginning, the reagent tube 1 contains magnetic beads (MB) and is sealed; the reagent tube 2 contains concentrated (or lyophilized) antibody and is sealed; the reagent tube 3 is empty and not sealed. Before being transferred to the assay processing tube assembly 420, the MB and the antibody can each be diluted using dilution buffer from a dispenser.

In the analyte capture step, the assay processing tube assembly 220 is at the angle as indicated in FIG. 14-1 and the reagent tube holder 310 is at the angle as indicated in FIG. 17-1. The dispenser dispenses a buffer into the reagent tube 1 to dilute the MB.

After the reagent tube 1 is diluted/mixed, the reagent tube holder 310 is slowly rotated [97] counterclockwise (FIG. 17-2) so that the reagent in the reagent tube 1 can break surface tension and flow into the assay processing tube's right arm opening. This step transfers the MB from the reagent tube 1 to the assay processing tube, and the MB can capture the analyte in the sample. To achieve better capture results, the assay processing tube can be rotated back and forth within a predefined angle range (such as around 10-30 degrees) at specific rotational speeds (such as alternating between 240 RPM and 90 RPM) to help mixing the MB with the sample.

In the labeling step, the reagent tube holder 310 is rotated clockwise to the angle as indicated in FIG. 17-3 and the dispenser dispenses a buffer into the reagent tube 2. This dispensing dilutes the antibody in the reagent tube 2.

After the reagent tube 2 is diluted/mixed, the reagent tube holder 310 is slowly rotated counterclockwise (FIG. 17-4) so that the reagent in the reagent tube 2 can break surface tension and flow into the assay processing tube's right arm opening. This step transfers the antibody from the reagent tube 2 to the assay processing tube. The analyte in the assay processing tube can be labeled by the antibody. To achieve better labeling results, the assay processing tube can be rotated back and forth within a predefined angle range at specific rotational speeds to facilitate mixing.

One or more magnetic washes can be performed after labeling. Prior to the wash step, the MB can be retained by the magnet to avoid loss. This wash step is achieved by coordinated movements (FIGS. 14-1, 14-2, 14-3, and 14-4) of the magnet and the assay processing tube. The assay processing tube's clockwise rotation can stop when it touches the drain platform 260 (FIG. 14-4). The MB can be concentrated in the assay processing tube near the top of the magnet. Solution with unbound reagents will flow out of the assay processing tube during this draining process. The absorbent material on the drain platform can further help the draining. Once draining is completed, the assay processing tube and the magnet will return (FIG. 14-4, 14-5, 14-6, and 14-7) to their original positions. At the end of the wash cycle, the reagent tube holder 310 transfers buffer to the assay processing tube from the dispenser (FIGS. 17-3 and 17-4, and FIG. 14-7).

Depending on the situation, the wash step can be repeated multiple times by iterating the steps as shown in FIGS. 14-1, 14-2, 14-3, 14-3, 14-4, 14-5, 14-6, and 14-7 and FIGS. 17-3 and 17-4.

To initiate the detection step, a TMB can be dispensed (FIG. 17-5) to the empty reagent tube 3. The TMB is dispensed from a different dispenser set. The reagent tube 3 is then rotated counterclockwise to the position as shown in FIG. 17-6 and transfers the TMB to the assay processing tube.

The assay processing tube can then be rotated counterclockwise until the SPE become horizontal (see FIGS. 14-7, 14-8, 14-9, 14-10, and 14-11). Simultaneously, the magnet can be raised to an upper position to concentrate the beads onto the working electrode. The electrical current generated from the reduction-oxidation reaction can be measured automatically.

Although the iMES assay pipeline is used to describe how the automation system is used, the automation steps can be customized to support other sequences. Different combinations of analyte capture, labeling, wash and detection steps can achieve similar sample-in and answer-out automation.

Figure 20:
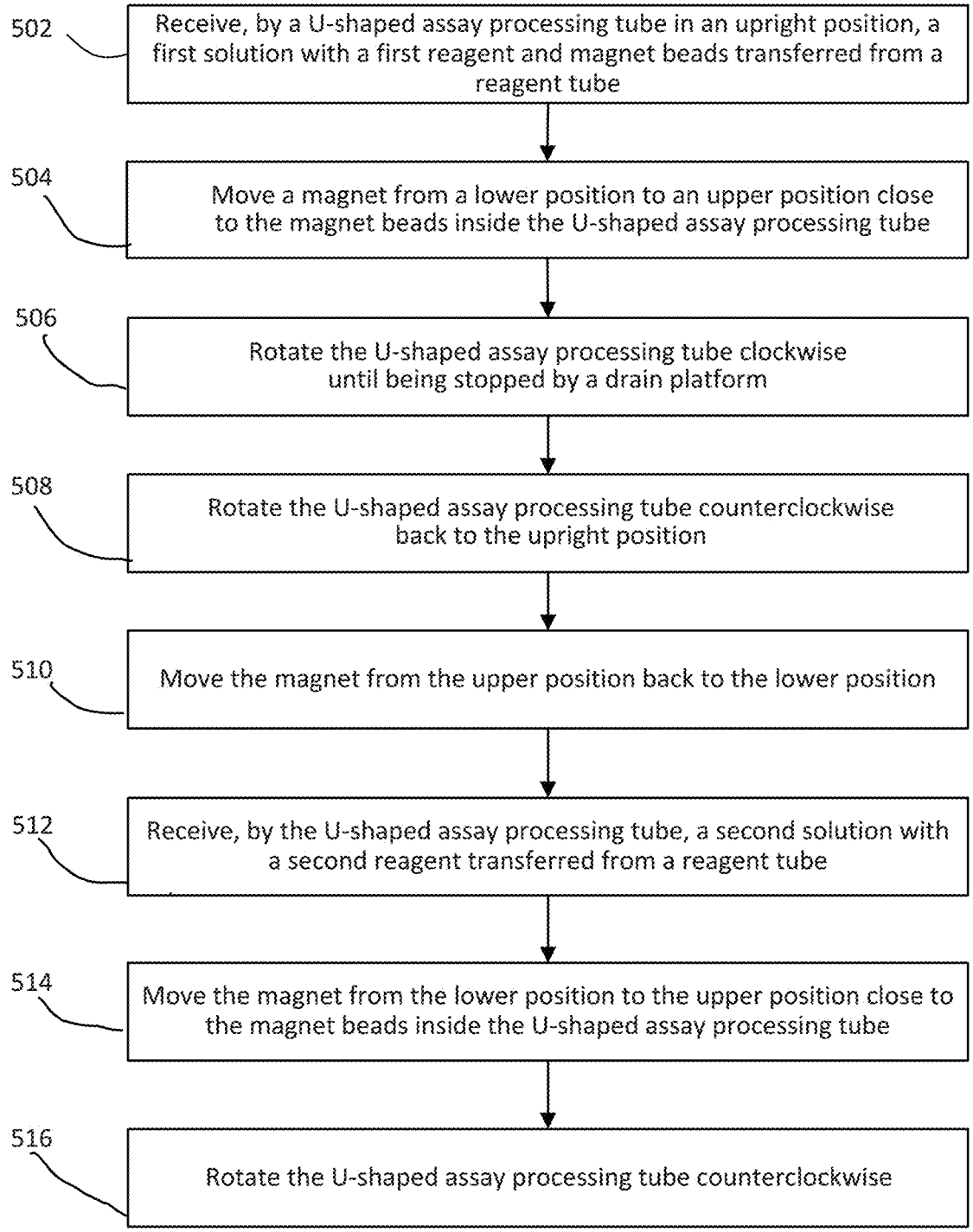
FIG. 20 illustrates a flowchart of an exemplary method for automated assay processing, according to various embodiments of the present disclosure.

FIG. 20 illustrates a flowchart of an exemplary method for automated assay processing 500, according to various embodiments of the present disclosure. In step 502, a U-shaped assay processing tube in an upright position may receive a first solution with a first reagent and magnetic beads transferred from a reagent tube. The U-shaped assay processing tube can be rotated back and forth within a predefined angle range at specific rotational speeds to facilitate mixing. The U-shaped assay processing tube has a right arm having an opening for receiving the first solution with the first reagent and magnetic beads and a left arm having an opening. An electrode, such as a screen-printed electrode, may be attached to the opening of the left arm. The U-shaped assay processing tube may be symmetric or asymmetric.

In step 504, a magnet may be moved from a lower position to an upper position close to the magnetic beads inside the U-shaped assay processing tube. In step 506, the U-shaped assay processing tube is rotated clockwise until touching a drain platform. The magnetic beads are concentrated in the U-shaped assay processing tube near the top of the magnet and the first solution with unbound first reagent may flow out of the U-shaped assay processing tube.

In step 508, the U-shaped assay processing tube may be rotated counterclockwise back to the upright position, and the magnet may be moved from the upper position back to the lower position in step 510.

In step 512, the U-shaped assay processing tube may receive a second solution with a second reagent transferred from a reagent tube, and in step 514, the magnet may be moved from the lower position to the upper position close to the magnetic beads inside the U-shaped assay processing tube. In step 516, the U-shaped assay processing tube is rotated counterclockwise until the first solution flows out from the opening of the left arm and the magnetic beads are retained in the U-shaped assay processing tube by the magnet or until the electrode becomes horizontal and the magnetic beads are retained on the electrode by the magnet. The U-shaped assay processing tube and the magnet may each be driven by a motor controlled by a controller.

Figure 21:
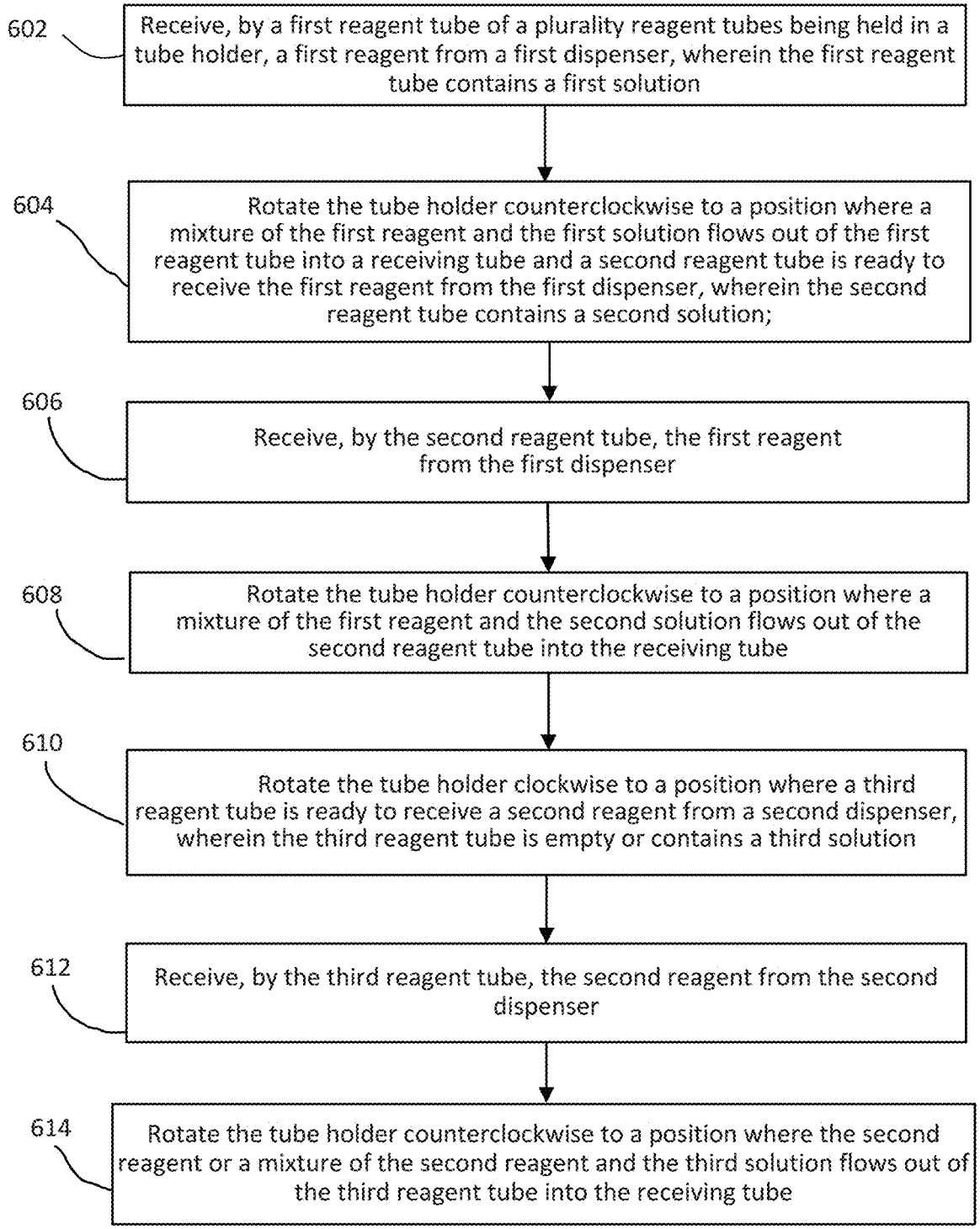
FIG. 21 illustrates a flowchart of an exemplary method for automated reagent dispensing and mixing, according to various embodiments of the present disclosure.

FIG. 21 illustrates a flowchart of an exemplary method for automated reagent dispensing and mixing 600, according to various embodiments of the present disclosure. In step 602, a first reagent tube, which may contain a first solution, of a plurality reagent tubes being held in a tube holder may receive a first reagent from a first dispenser. In step 604, the tube holder may be rotated counterclockwise to a position where a mixture of the first reagent and the first solution flows out of the first reagent tube into a receiving tube and a second reagent tube, which may contain a second solution, is ready to receive the first reagent from the first dispenser.

In step 606, the second reagent tube may receive the first reagent from the first dispenser, and in step 608, the tube holder may be rotated counterclockwise to a position where a mixture of the first reagent and the second solution flows out of the second reagent tube into the receiving tube.

In step 610, the tube holder may be rotated clockwise to a position where a third reagent tube, which may be empty or contain a third solution, is ready to receive a second reagent from a second dispenser.

In step 612, the third reagent tube may receive the second reagent from the second dispenser, and in step 614, the tube holder may be rotated counterclockwise to a position where the second reagent or a mixture of the second reagent and the third solution flows out of the third reagent tube into the receiving tube.

The above steps may be repeated to obtain a mixture of multiple reagents and multiple solutions.

It is to be appreciated that some of the steps may be optional to perform the disclosure provided herein. Further, some of the steps may be performed simultaneously, or in a different order than shown in FIGS. 20 and 21.

Figure 22:
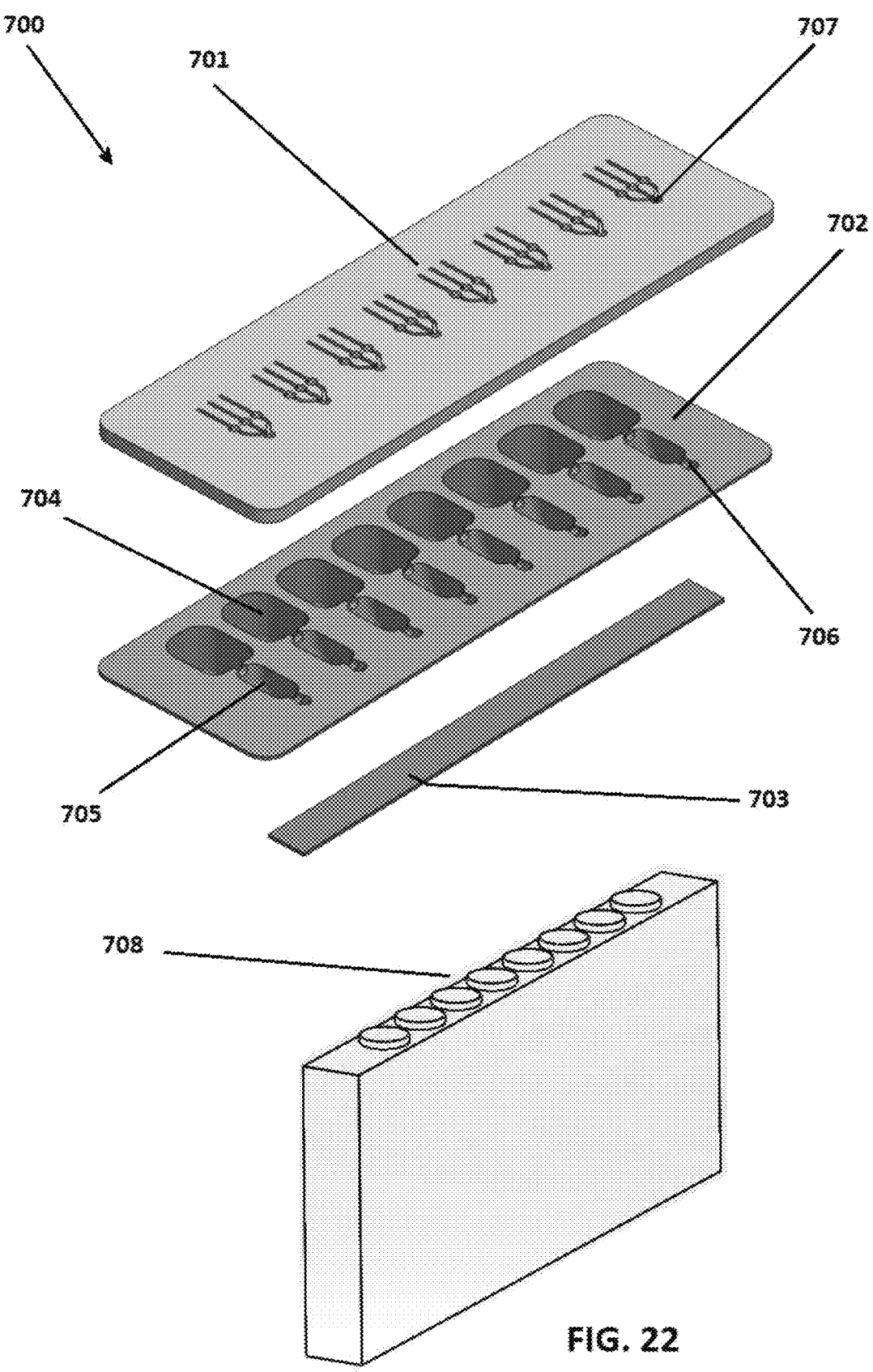
FIG. 22 illustrates a schematic diagram of another exemplary assay automation system, in isometric view, according to some embodiments of the present disclosure.
Figure 23:
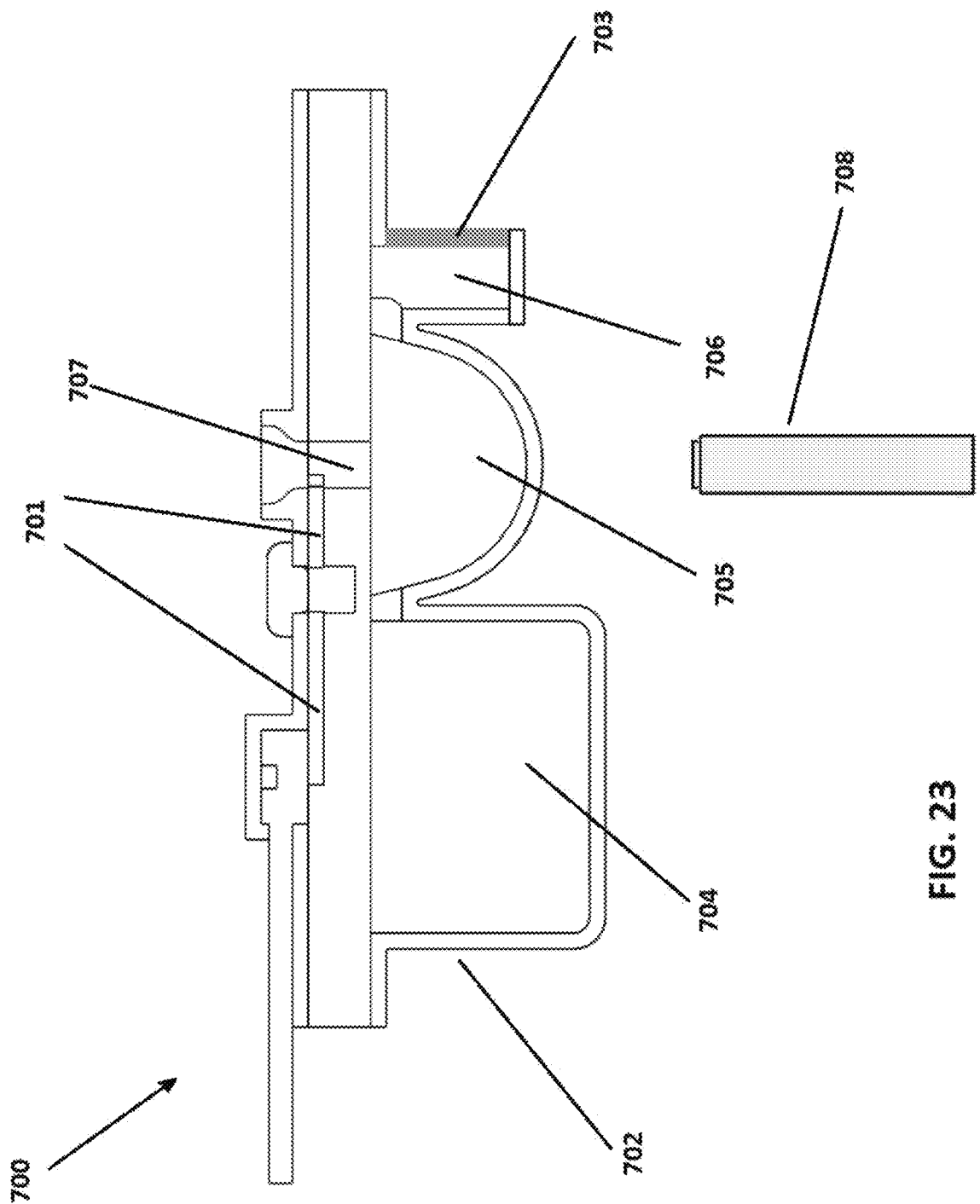
FIG. 23 illustrates the major components of the exemplary assay automation system of FIG. 22, in side view, according to various embodiments of the present disclosure.

FIGS. 22-23 illustrate another exemplary automated assay processing system, an automated reagent transferring system, and an exemplary assay automation system, which is a combination of the automated assay processing system and the automated reagent transferring system. These systems utilize clockwise and counterclockwise rotations of reaction vessels and coordinated linear movements of magnets to manipulate the magnetic beads (MB) and other reagents. These systems can achieve automatic reagent mixing, incubation, magnetic separation, electrochemical reaction, and measurement, etc. The present invention can be used in different applications, especially in the fields of biotechnology, biochemistry, and biomedicine.

FIGS. 22-23 illustrate the major components of an exemplary assay automation system 700, which include a reagent cartridge assembly 701, an assay processing tube assembly 702 of a pre-configured shape, a magnet assembly 708, and an electrode assembly 703. The assay processing tube assembly 702 can have a plurality of assay processing tubes (eight shown in FIG. 22). Each assay processing tube can include a reaction chamber 705 in a center position, a waste chamber 704 attached to one end of the reaction chamber 705 and a measurement chamber 706 attached to the other end of the reaction chamber 705. The reaction chamber 705 is used for receiving a reagent and also decanting solution in the waste chamber 704 or in the measurement chamber 706. The electrode assembly 703, such as an SPE, can be fixed to the measurement chambers 706. The reagent cartridge assembly 701 has a plurality of fluidic channels. Each fluidic channel is configured to hold a specific reagent, either in liquid, dried or lyophilized form. The reagent cartridge assembly 701 is connected to the assay processing tube assembly 702. Each fluidic channel has a reagent outlet 707. Through the reagent outlet 707, the reaction chamber 705 can receive a reagent from the fluidic channel or directly from a user's pipette, or other source. The magnet assembly 708 includes a plurality of magnets secured on a magnet holder. The number of magnets corresponds to the number of assay processing tubes. The magnet assembly 708 can be driven by a stepper motor (not shown) to move vertically. The assay processing tube assembly 702 is driven by a stepper motor (not shown) to rotate. The assay processing tube assembly can be of a special shape (FIG. 22 shows a U-shape, but other shapes such as V, N, W, L, C, etc. are also possible). A controller can be configured to control coordinated movements of the assay processing tube assembly 702, the reagent cartridge assembly 701, and the magnet assembly 708 to perform an assay processing sequence.

Figure 24:
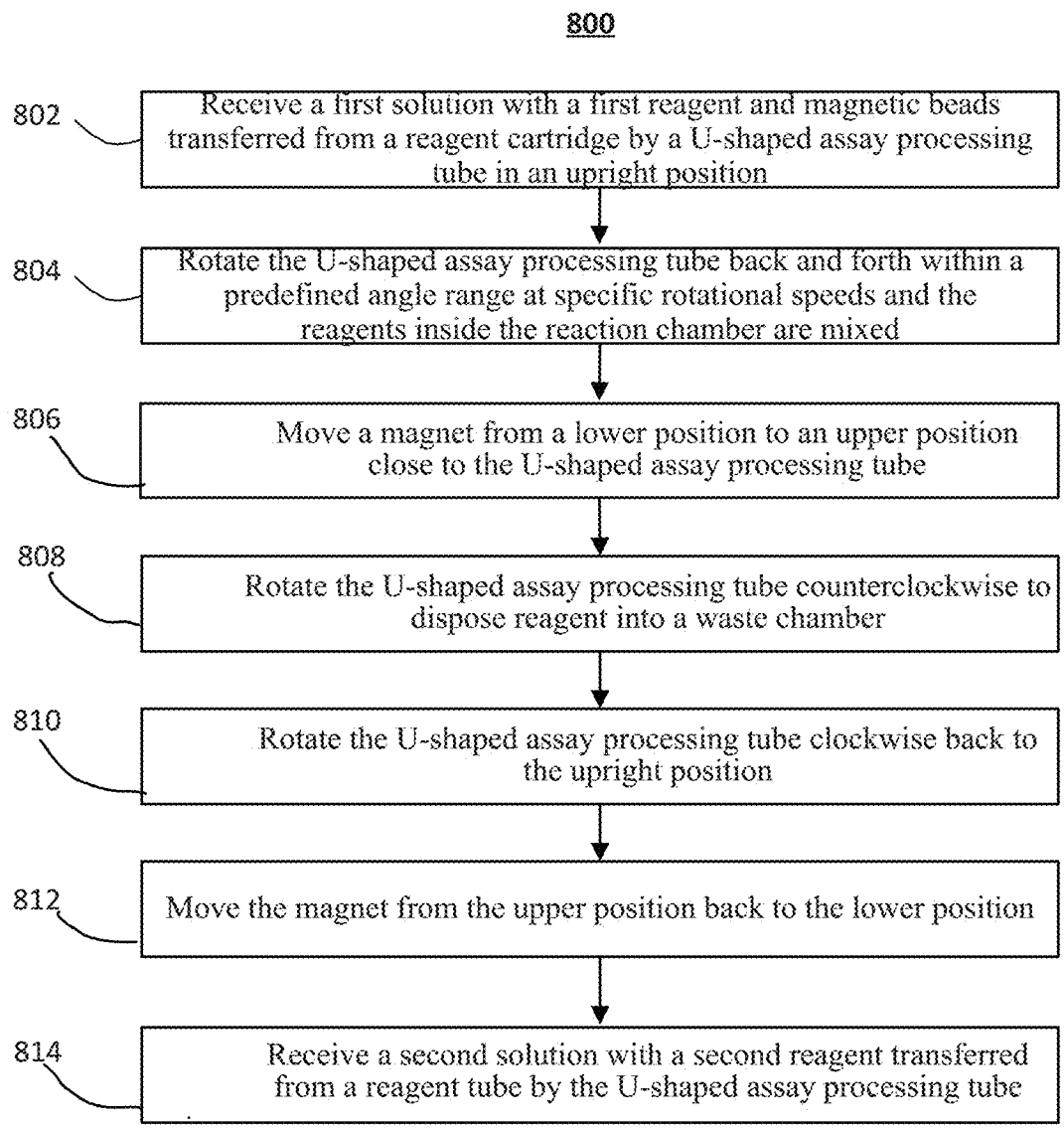
FIG. 24 illustrates a flowchart of an exemplary method for automated assay processing, according to various embodiments of the present disclosure.

FIG. 24 illustrates a flowchart of an exemplary method for automated assay processing 800, according to various embodiments of the present disclosure. In step 802, a first solution with a first reagent and magnetic beads transferred from a reagent cartridge is received by a U-shaped assay processing tube in an upright position. In step 804, the U-shaped assay processing tube can be rotated back and forth within a predefined angle range at specific rotational speeds to facilitate mixing. The U-shaped assay processing tube has a reaction chamber having an opening for receiving the first solution with the first reagent (e.g., magnetic beads). In step 806, a magnet is moved from a lower position to an upper position close to the U-shaped assay processing tube. In step 808, the U-shaped assay processing tube is rotated counterclockwise to dispose reagent into a waste chamber. The magnetic beads are concentrated in the U-shaped assay processing tube near the magnet and the first solution with unbound first reagent flows out of the U-shaped assay processing tube. In step 810, the U-shaped assay processing tube is rotated clockwise back to the upright position. In step 812, the magnet is moved from the upper position back to the lower position. In step 814, a second solution with a second reagent transferred from a reagent tube is received by the U-shaped assay processing tube.

Figure 25:
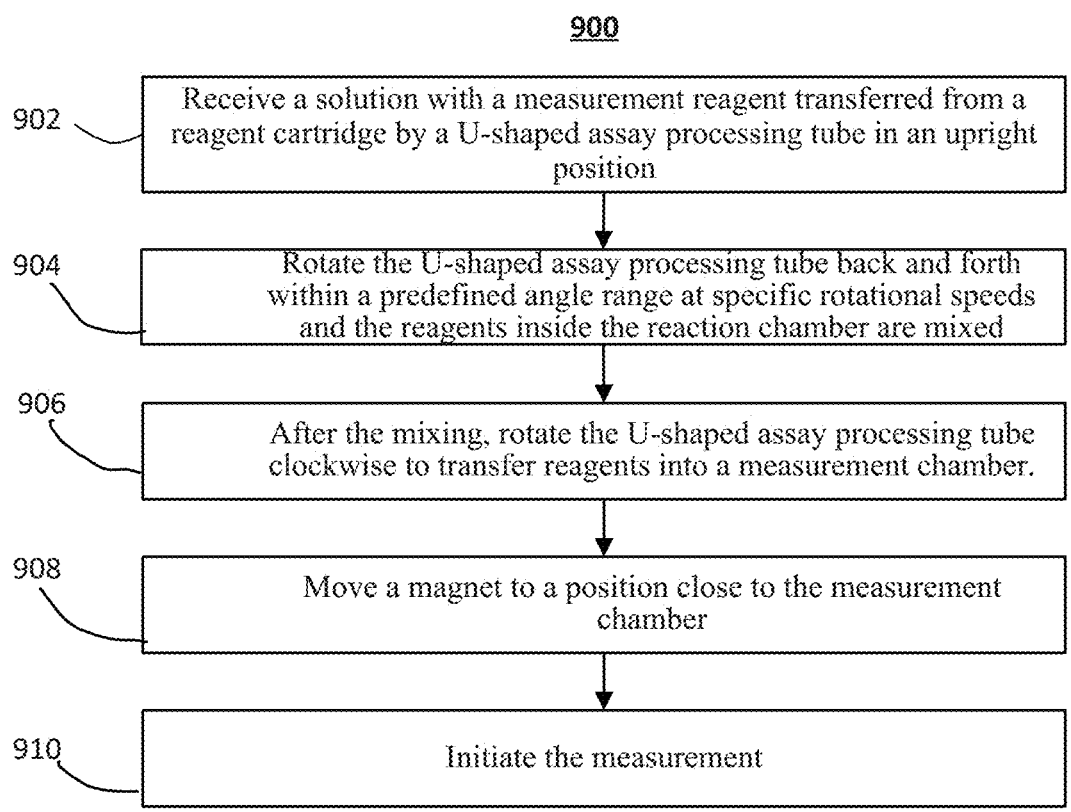
FIG. 25 illustrates a flowchart of an exemplary method for automated assay processing and measurement, according to various embodiments of the present disclosure.

FIG. 25 illustrates a flowchart of an exemplary method for automated assay processing and measurement 900, according to various embodiments of the present disclosure. In step 902, a solution with a measurement reagent transferred from a reagent cartridge is received by a U-shaped assay processing tube in an upright position. The U-shaped assay processing tube has a reaction chamber having an opening for receiving the solution with the measurement reagent (e.g., TMB). In step 904, the U-shaped assay processing tube is rotated back and forth within a predefined angle range at specific rotational speeds and the reagents inside the reaction chamber are mixed. In step 906, after the mixing, the U-shaped assay processing tube is rotated clockwise to transfer reagents into a measurement chamber. In step 908, a magnet is moved to a position close to the measurement chamber. The magnetic beads are concentrated by the magnet on the working electrode in the measurement chamber. In step 910, the measurement is initiated.

According to one aspect of the present disclosure, an assay automation system includes a reagent tube holder having a plurality of tube-holding arms. Each tube-holding arm is configured to hold a reagent tube, and the reagent tube holder is driven to rotate. The assay automation system also includes an assay processing tube having a right arm and a left arm. The right arm has an opening for receiving reagent transferred from a reagent tube being held in one of the tube-holding arms of the reagent tube holder. The assay processing tube is driven to rotate. The assay automation system further includes a magnet being driven to move vertically and a controller configured to control coordinated movements of the reagent tube holder, the assay processing tube, and the magnet to perform an assay processing sequence.

In some embodiments, the reagent tube holder has three tube-holding arms separated at 120 degrees. In some embodiments, the assay processing tube has a U-shape.

In some embodiments, the left arm of the assay processing tube has an opening being fixed with an electrode. In some embodiments, the electrode is a screen-printed electrode. The screen-printed electrode is connected to a circuit board via a cable, according to some embodiments.

In some embodiments, the magnet is movable vertically between a lower position and an upper position.

In some embodiments, the reagent tube holder, the assay processing tube, and the magnet are each driven by a motor controlled by the controller. In some embodiments, the magnet is secured on a magnet holder being driven by a motor controlled by the controller.

In some embodiments, the assay automation system includes a drain platform for removing reagents during a draining process. In some embodiments, the drain platform has an absorbent material deposited on a surface of the drain platform.

According to another aspect of the present disclosure, an automated assay processing system includes an assay processing tube assembly of a pre-configured shape. The assay processing tube assembly includes a plurality of assay processing tubes. Each assay processing tube includes a right arm having an opening for receiving a reagent and a left arm having an opening. The assay processing tube assembly is driven to rotate. The automated assay processing system also includes a magnet assembly including a plurality of magnets secured on a magnet holder. A number of magnets correspond to a number of assay processing tubes, and the magnet assembly is driven to move vertically. The automated assay processing system further includes a controller configured to control coordinated movements of the assay processing tube assembly and the magnet assembly to perform an assay processing sequence.

In some embodiments, the pre-configured shape of the assay processing tube assembly is one of a U-shape, a V-shape, an N-shape, a W-shape, an L-shape, or a C-shape.

In some embodiments, the pre-configured shape of the assay processing tube assembly is selected based on different assay processing processes.

In some embodiments, the pre-configured shape of the assay processing tube assembly is a U-shape. In some embodiments, the U-shape is symmetric. In some embodiments, the U-shape is asymmetric.

In some embodiments, the assay processing tube assembly has a number of assay processing tubes within the range of 1-16, and the magnet assembly has a number of magnets corresponding to the number of assay processing tubes. In some embodiments, the assay processing tube assembly has 8 assay processing tubes and the magnet assembly has 8 corresponding magnets.

In some embodiments, an electrode is attached to the opening of the left arm of each assay processing tube. In some embodiments, the electrode is a screen-printed electrode. In some embodiments, the screen-printed electrode is connected to a circuit board via a cable.

In some embodiments, the magnet assembly is movable vertically between a lower position and an upper position.

In some embodiments, the assay processing tube assembly and the magnet assembly are each driven by a motor controlled by the controller.

In some embodiments, the automated assay processing system further includes a drain platform for removing reagents during a draining process. In some embodiments, the drain platform has an absorbent material deposited on a surface of the drain platform.

According to yet another aspect of the present disclosure, an automated reagent transferring system includes a reagent tube holder having a plurality of tube-holding arms. Each tube-holding arm is configured to hold a set of a plurality of reagent tubes, and the reagent tube holder is driven to rotate. The automated reagent transferring system also includes one or more sets of dispensers above the reagent tube holder. Each set of dispensers has a same number of dispensers as a number of reagent tubes in each set of reagent tubes. The automated reagent transferring system further includes a controller configured to control coordinated movements of the reagent tube holder and the dispensers to achieve a coordination between the reagent tube holder and the dispensers.

In some embodiments, the reagent tube holder has three arms separated at 120 degrees.

In some embodiments, each arm is configured to hold a number of reagent tubes within the range of 1-16. In some embodiments, each set of dispensers has a number of dispensers within the range of 1-16 corresponding to the number of reagent tubes held by each arm of the reagent tube holder. In some embodiments, each arm is configured to hold 8 reagent tubes and each set of dispensers has 8 dispensers.

In some embodiments, the one or more sets of dispensers include a plurality sets of dispensers arranged along a horizontal direction.

In some embodiments, the reagent tube holder and the one or more sets of dispensers are each driven by a motor controlled by the controller.

According to yet another aspect of the present disclosure, an assay automation system includes an assay processing tube assembly of a pre-configured shape. The assay processing tube assembly includes a plurality of assay processing tubes. Each assay processing tube includes a right arm having an opening for receiving a reagent and a left arm having an opening, and the assay processing tube assembly is driven to rotate. The assay automation system also includes a reagent tube holder having a plurality of arms. Each arm is configured to hold a set of a plurality of reagent tubes, and a number of reagent tubes in each set of reagent tubes correspond to a number of assay processing tubes of the assay processing tube assembly. The reagent tube holder is driven to rotate. The assay automation system further includes a magnet assembly including a plurality of magnets secured on a magnet holder. A number of magnets correspond to a number of assay processing tubes, and the magnet assembly is driven to move vertically. The assay automation system further includes a controller configured to control coordinated movements of the assay processing tube assembly, the reagent tube holder, and the magnet assembly to perform an assay processing sequence.

In some embodiments, the assay automation system further includes one or more sets of dispensers above the reagent tube holder. Each set of dispensers has a same number of dispensers as a number of reagent tubes in each set of reagent tubes.

In some embodiments, the pre-configured shape of the assay processing tube assembly is one of a U-shape, a V-shape, an N-shape, a W-shape, an L-shape, or a C-shape. In some embodiments, the pre-configured shape of the assay processing tube assembly is selected based on different assay processing processes.

In some embodiments, the pre-configured shape of the assay processing tube assembly is a U-shape. In some embodiments, the U-shape is symmetric. In some embodiments, the U-shape is asymmetric.

In some embodiments, the assay processing tube assembly has a number of assay processing tubes within the range of 1-16, and the magnet assembly has a number of magnets corresponding to the number of assay processing tubes. In some embodiments, the assay processing tube assembly has 8 assay processing tubes, and the magnet assembly has 8 corresponding magnets.

In some embodiments, an electrode is attached to the opening of the left arm of each assay processing tube. In some embodiments, the electrode is a screen-printed electrode. In some embodiments, the screen-printed electrode is connected to a circuit board via a cable.

In some embodiments, the magnet assembly is movable vertically between a lower position and an upper position.

In some embodiments, the assay processing tube assembly, the reagent tube holder, and the magnet assembly are each driven by a motor controlled by the controller.

In some embodiments, the assay automation system further includes a drain platform for removing reagents during a draining process. In some embodiments, the drain platform has an absorbent material deposited on a surface of the drain platform.

In some embodiments, the reagent tube holder has three arms separated at 120 degrees. In some embodiments, each arm is configured to hold a number of reagent tubes within the range of 1-16. In some embodiments, each set of dispensers has a number of dispensers within the range of 1-16 corresponding to the number of reagent tubes held by each arm of the reagent tube holder.

In some embodiments, each arm is configured to hold 8 reagent tubes and each set of dispensers has 8 dispensers.

In some embodiments, the one or more sets of dispensers include a plurality sets of dispensers arranged along a horizontal direction.

According to yet another aspect of the present disclosure, an assay automation system includes an assay processing tube assembly of a pre-configured shape, a reagent cartridge assembly, a magnet assembly, and a controller. The assay processing tube assembly includes one or more assay processing tubes. The reagent cartridge assembly has one or more fluidic channels. Each fluidic channel is configured to hold specific reagents, either in liquid, dried or lyophilized form. The reagent cartridge assembly is connected to the assay processing tube assembly. Each assay processing tube has a reaction chamber in the center position, a waste chamber attached to one end of the reaction chamber and a measurement chamber attached to the other end. The assay processing tube assembly is driven to rotate. The magnet assembly includes one or more magnets secured on a magnet holder. The number of magnets corresponds to the number of assay processing tubes. The magnet assembly is driven to move vertically. The controller is configured to control coordinated movements of the assay processing tube assembly, the reagent cartridge assembly, and the magnet assembly to perform an assay processing sequence.

In some embodiments, the assay automation system further includes one or more sets of reagent reservoirs connected to the fluidic channels. In some embodiments, the reagent reservoirs are syringes or blister packs.

In some embodiments, the pre-configured shape of the assay processing tube assembly is one of a U-shape, a V-shape, an N-shape, a W-shape, an L-shape, or a C-shape. In some embodiments, the pre-configured shape of the assay processing tube assembly is selected based on different assay processing processes. In some embodiments, the pre-configured shape of the assay processing tube assembly is a U-shape. In some embodiments, the U-shape is symmetric. In some embodiments, the U-shape is asymmetric.

In some embodiments, the assay processing tube assembly has a number of assay processing tubes within the range of 1-16, and the magnet assembly has a number of magnets corresponding to the number of assay processing tubes. In some embodiments, the assay processing tube assembly has 8 assay processing tubes and the magnet assembly has 8 corresponding magnets.

In some embodiments, an electrode is attached to the measurement chamber of each assay processing tube. In some embodiments, the electrode is a screen-printed electrode. In some embodiments, the screen-printed electrode is connected to a circuit board via a cable.

In some embodiments, the magnet assembly is movable vertically between a lower position and an upper position.

In some embodiments, the assay processing tube assembly, the reagent cartridge, and the magnet assembly are each driven by a motor controlled by the controller.

In some embodiments, the waste chamber is for removing reagents during a draining process. In some embodiments, the waste chamber has an absorbent material deposited in the waste chamber.

According to a different aspect of the present disclosure, a method for automated assay processing includes receiving, by a U-shaped assay processing tube in an upright position, a first solution with a first reagent and magnetic beads transferred from a reagent tube. The U-shaped assay processing tube has a right arm having an opening for receiving the first solution with the first reagent and magnetic beads and a left arm having an opening. The method for automated assay processing includes rotating the U-shaped assay processing tube back and forth within a predefined angle range at specific rotational speeds and moving a magnet from a lower position to an upper position close to the magnetic beads inside the U-shaped assay processing tube. The method for automated assay processing further includes rotating the U-shaped assay processing tube clockwise until being stopped by a drain platform. The magnetic beads are concentrated in the U-shaped assay processing tube near the top of the magnet and the first solution with unbound first reagent flows out of the U-shaped assay processing tube. The method for automated assay processing yet further includes rotating the U-shaped assay processing tube counterclockwise back to the upright position and moving the magnet from the upper position back to the lower position. The method for automated assay processing still further includes receiving, by the U-shaped assay processing tube, a second solution with a second reagent transferred from a reagent tube, moving the magnet from the lower position to the upper position close to the magnetic beads inside the U-shaped assay processing tube, and rotating the U-shaped assay processing tube counterclockwise.

In some embodiments, the U-shaped assay processing tube is rotated counterclockwise until the first solution flows out from the opening of the left arm and the magnetic beads are retained in the U-shaped assay processing tube by the magnet.

In some embodiments, an electrode is attached to the opening of the left arm. In some embodiments, the electrode is a screen-printed electrode.

In some embodiments, the U-shaped assay processing tube is rotated counterclockwise until the electrode becomes horizontal and the magnetic beads are retained on the electrode by the magnet.

In some embodiments, the U-shaped assay processing tube is symmetric. In some embodiments, the U-shaped assay processing tube is asymmetric.

In some embodiments, the U-shaped assay processing tube and the magnet are each driven by a motor controlled by a controller.

According to another different aspect of the present disclosure, a method for automated reagent dispensing and mixing includes receiving, by a first reagent tube of a plurality reagent tubes being held in a tube holder, a first reagent from a first dispenser. The first reagent tube contains a first solution. The method for automated reagent dispensing and mixing also includes rotating the tube holder counterclockwise to a position where a mixture of the first reagent and the first solution flows out of the first reagent tube into a receiving tube and a second reagent tube is ready to receive the first reagent from the first dispenser. The second reagent tube contains a second solution. The method for automated reagent dispensing and mixing further includes receiving, by the second reagent tube, the first reagent from the first dispenser and rotating the tube holder counterclockwise to a position where a mixture of the first reagent and the second solution flows out of the second reagent tube into the receiving tube. The method for automated reagent dispensing and mixing yet further includes rotating the tube holder clockwise to a position where a third reagent tube is ready to receive a second reagent from a second dispenser and receiving, by the third reagent tube, the second reagent from the second dispenser. The third reagent tube is empty or contains a third solution. The method for automated reagent dispensing and mixing still further includes rotating the tube holder counterclockwise to a position where the second reagent or a mixture of the second reagent and the third solution flows out of the third reagent tube into the receiving tube.

In some embodiments, the method for automated reagent dispensing and mixing further includes repeating the steps to obtain a mixture of multiple reagents and multiple solutions.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A system for assay automation, comprising:
    an assay processing tube assembly of a pre-configured shape, the assay processing tube assembly including one or more assay processing tubes, each assay processing tube including a reaction chamber for receiving a reagent, a built-in waste chamber at one end of the reaction chamber, and an absorbent material deposited in the waste chamber to accelerate reagent removal during a draining process, wherein the assay processing tube has a longitudinal axis along which the reaction chamber and the waste chamber are aligned, and the assay processing tube is configured to rotate about a horizontal axis that is perpendicular to the longitudinal axis of the assay processing tube assembly;
    a magnet assembly including one or more magnets secured on a magnet holder, a number of magnets corresponding to a number of assay processing tubes, the magnet assembly being driven to move vertically in line with a longitudinal axis of the one or more magnets; and
    a controller configured to control coordinated movements of the assay processing tube assembly and the magnet assembly to perform an assay processing sequence, wherein each magnet of the one or more magnets interfaces intermittently with its corresponding assay processing tube in more than one area during an assay processing sequence, wherein the assay processing sequence comprises one or more of reagent mixing, draining, incubation, magnetic separation, electrochemical reaction, or measurement, and wherein the longitudinal axis of the one or more magnets is perpendicular to the horizontal axis of the assay processing tube assembly.

2. The system of claim 1, further comprising a reagent cartridge assembly configured to have one or more fluidic channels, wherein said one or more fluidic channels correspond to a number of said one or more assay processing tubes of the said assay processing tube assembly, and one or more sets of reagent reservoirs connected to the said fluidic channels.

3. The system of claim 2, wherein the reagent reservoirs are syringes or blister packs.

4. The system of claim 1, further comprising one or more sets of dispensers above the assay processing tubes, each set of dispensers having a same number of dispensers as a number of assay processing tubes in each set of assay processing tubes.

5. The system of claim 1, wherein the pre-configured shape of the reaction chamber of the assay processing tube assembly is one of a U-shape, a V-shape, an L-shape, or a C-shape, and is determined based on a plane perpendicular to a rotational axis of each of the one or more assay processing tubes.

6. The system of claim 1, wherein the assay processing tube assembly has a number of assay processing tubes within a range of 1-16, and the magnet assembly has a number of magnets corresponding to the number of assay processing tubes.

7. The system of claim 6, wherein the assay processing tube assembly has 8 assay processing tubes and the magnet assembly has 8 corresponding magnets.

8. The system of claim 1, wherein an electrode is attached to each assay processing tube of the one or more assay processing tubes.

9. The system of claim 8, wherein the electrode is a screen-printed electrode configured to rotate between positions parallel to and perpendicular to the longitudinal axis of the magnet.

10. The system of claim 1, wherein the assay processing tube assembly and the magnet assembly are each driven by a motor controlled by the controller.

11. The system of claim 1, wherein each assay processing tube further includes a measurement chamber connected to the other end of the reaction chamber.

12. A method for automated assay processing, comprising:
    receiving, by an assay processing tube in an upright position, a first solution with a first reagent and magnetic beads transferred from a reagent tube or a channel, wherein the assay processing tube has a reaction chamber for receiving a reagent, a built-in waste chamber at one end of the reaction chamber, and an absorbent material deposited in the waste chamber to accelerate reagent removal during a draining process, wherein the assay processing tube has a longitudinal axis along which the reaction chamber and the waste chamber are aligned, the assay processing tube is configured to rotate about a horizontal axis that is perpendicular to the longitudinal axis of the assay processing tube during an assay processing sequence, and the assay processing sequence comprises one or more of reagent mixing, draining, incubation, magnetic separation, electrochemical reaction, or measurement;

rotating the assay processing tube about the horizontal axis within a predefined angle range at one or more rotational speeds;

moving a magnet vertically in line with a longitudinal axis of the magnet from a lower position to an upper position proximate to the assay processing tube at a first interface area, wherein the longitudinal axis of the magnet is perpendicular to the horizontal axis of the assay processing tube;

rotating the assay processing tube in one direction such that the magnet interfaces with a second interface area of the assay processing tube, wherein the magnetic beads are concentrated in the assay processing tube at the second interface area near a top of the magnet and the first solution with unbound first reagent flows into the absorbent material;

rotating the assay processing tube back to the upright position;

moving the magnet from the upper position back to the lower position;

receiving, by the assay processing tube, a second solution with a second reagent transferred from a reagent tube; and rotating the assay processing tube in both directions.

13. The method of claim 12, wherein:

an electrode is attached to one arm, the electrode is a screen-printed electrode, and the assay processing tube is rotated until the electrode becomes horizontal and the magnetic beads are retained on the electrode by the magnet.

* * * * *